Nov. 11, 1969    J. T. SCHULLER ET AL    3,477,556
CONTROL AND CHANGE MAKER FOR A VENDOR
Filed Oct. 23, 1967    14 Sheets-Sheet 2
FIG. 3
FIG. 4
FIG. 2
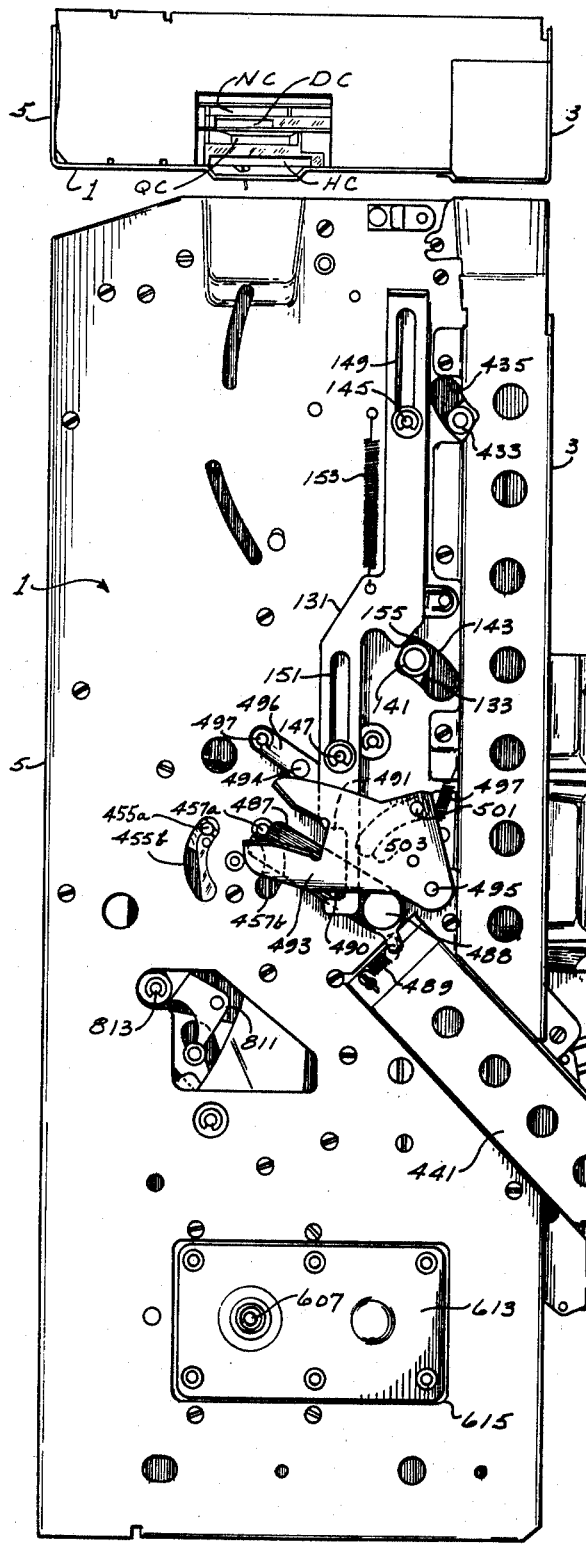
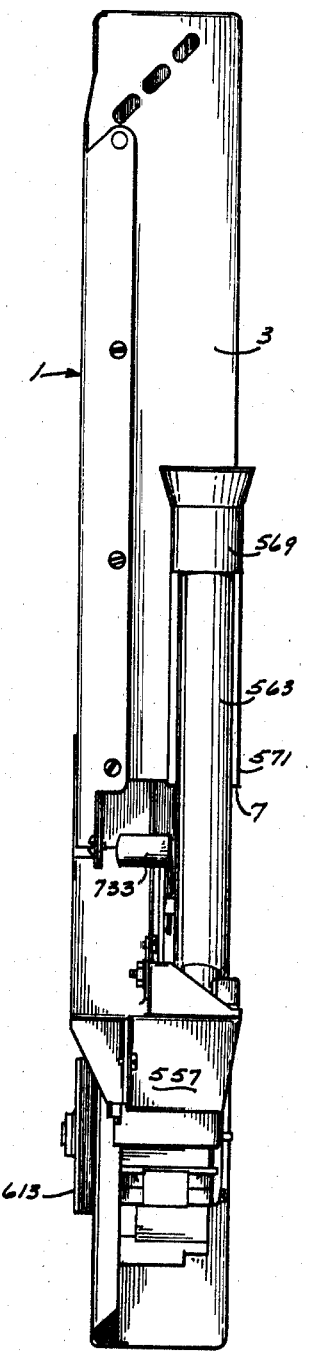

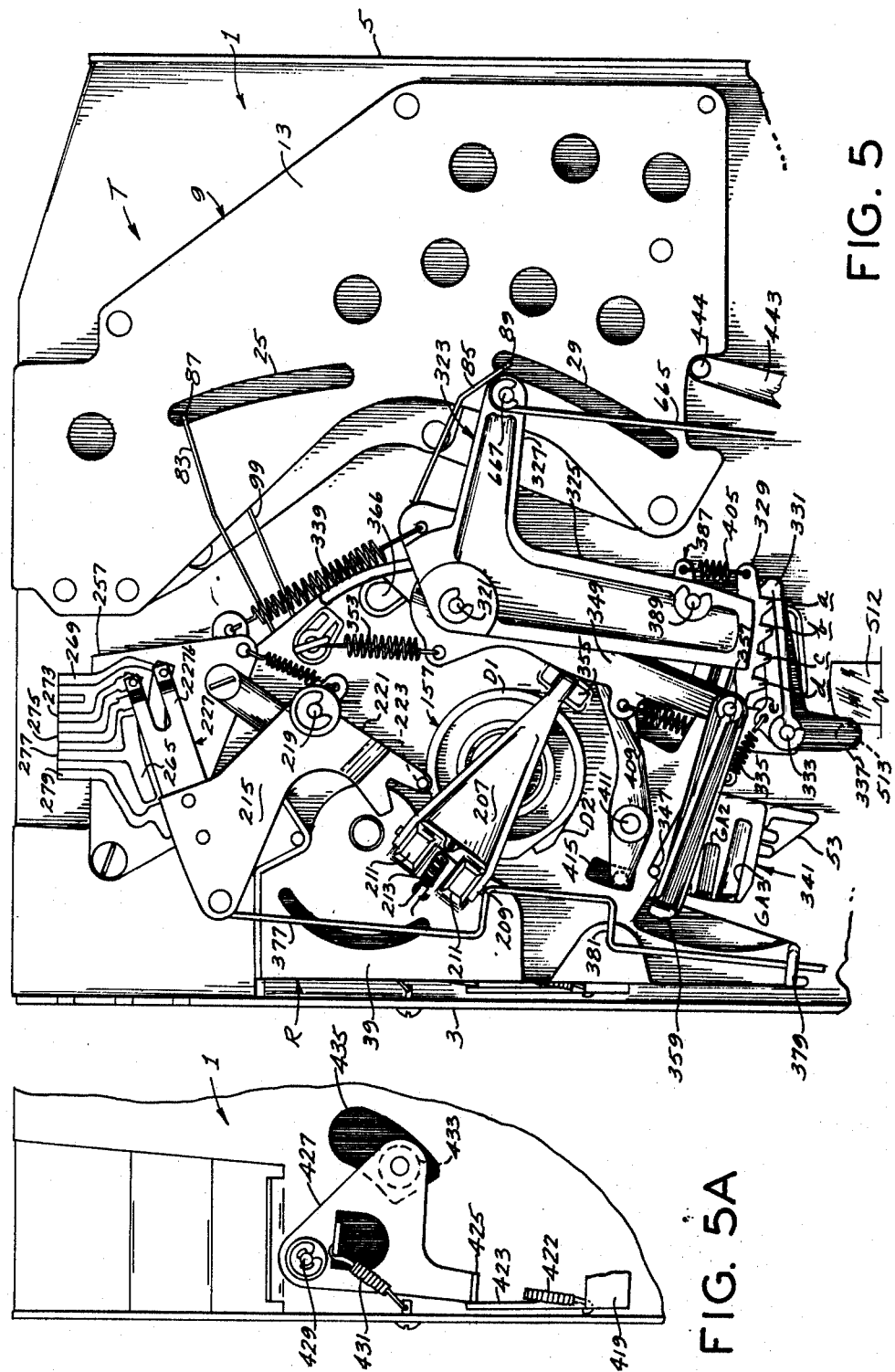

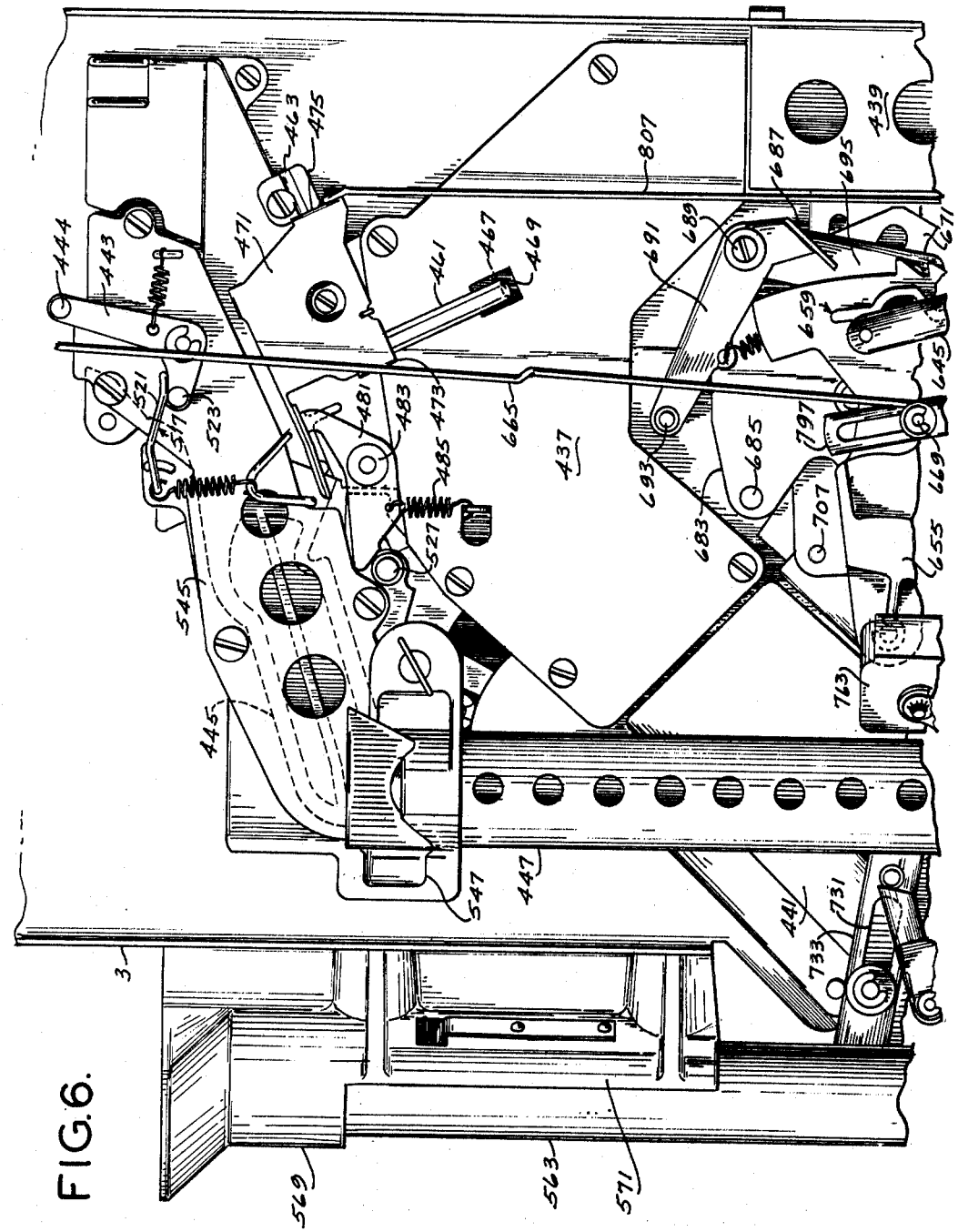

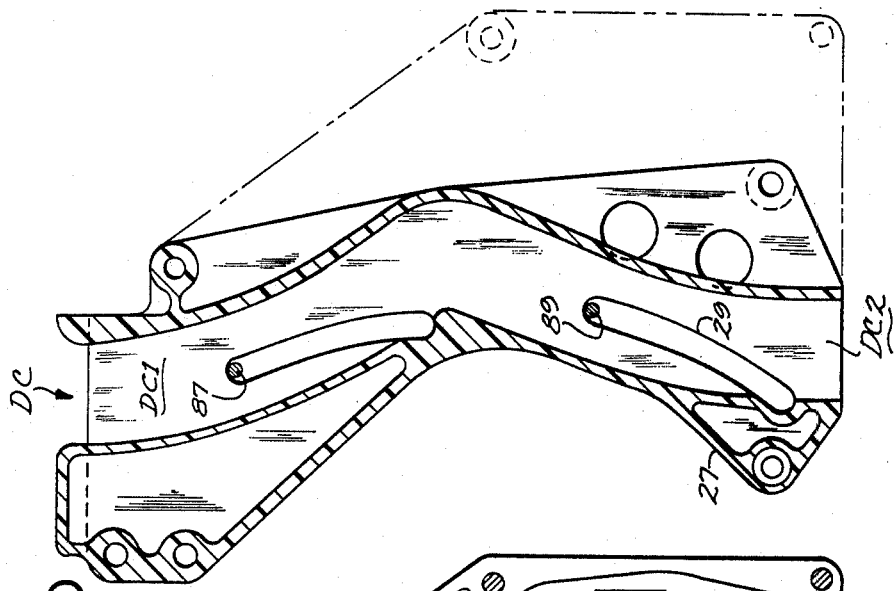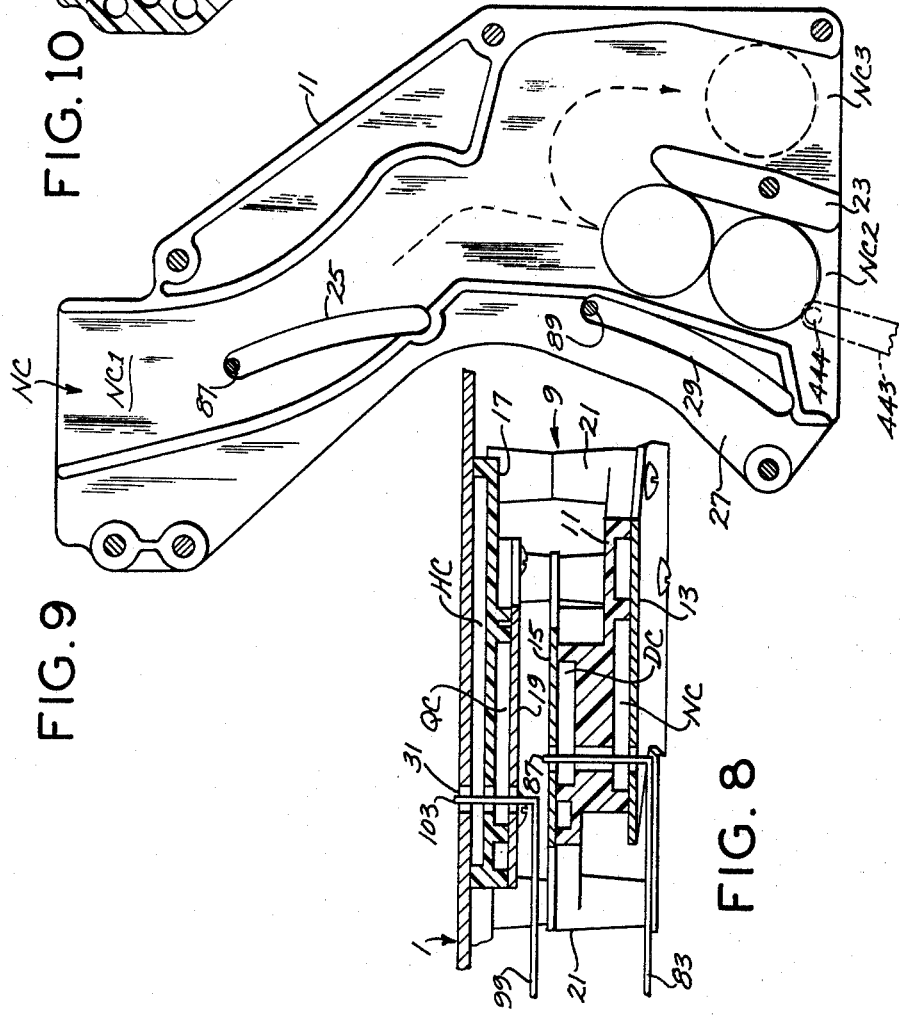

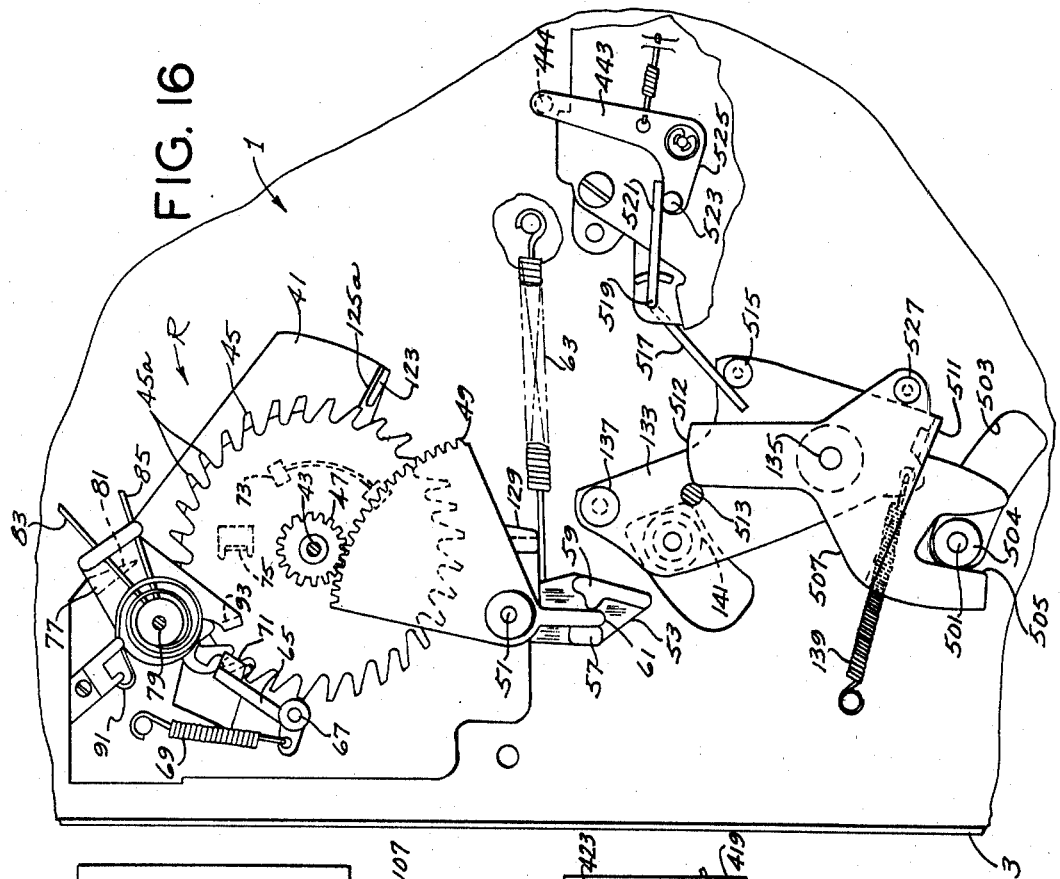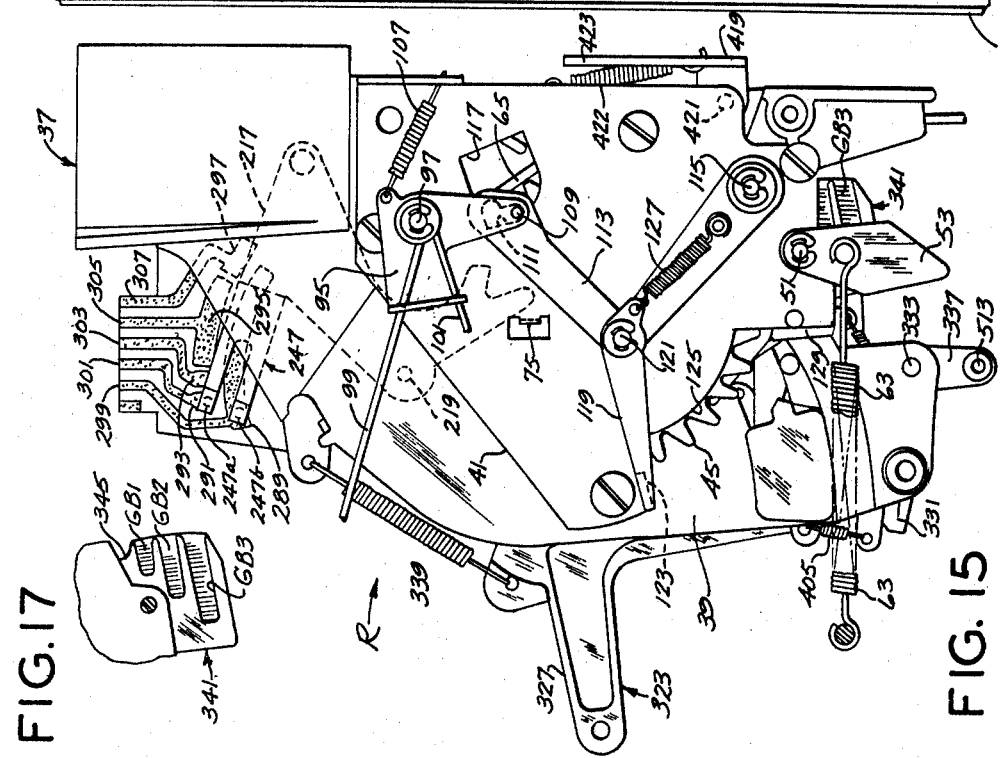

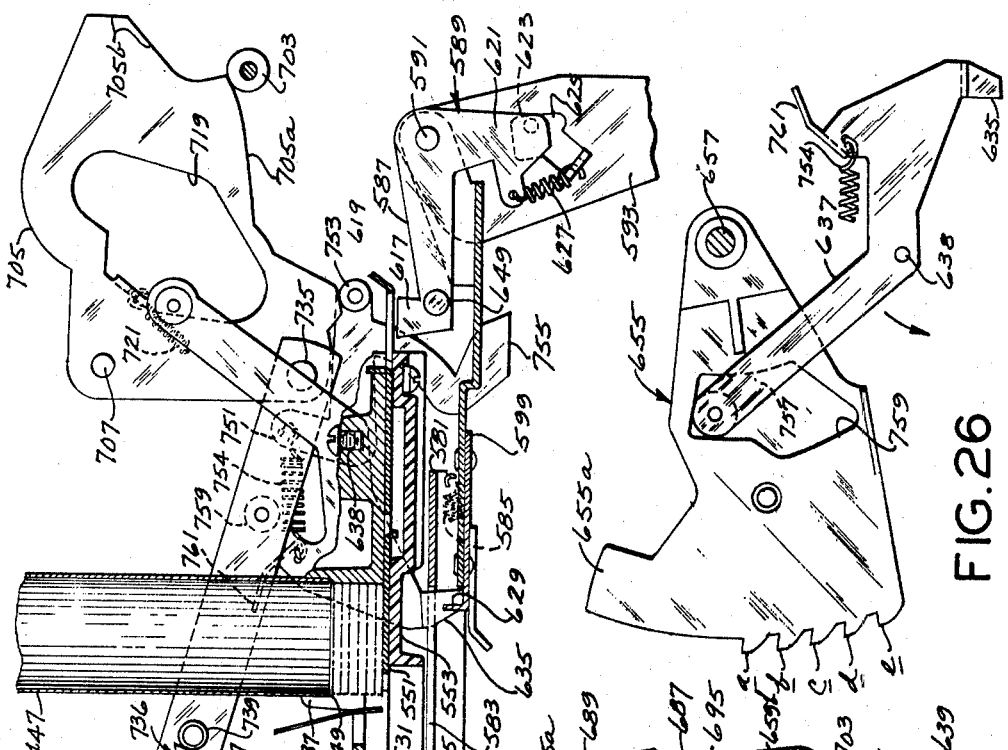

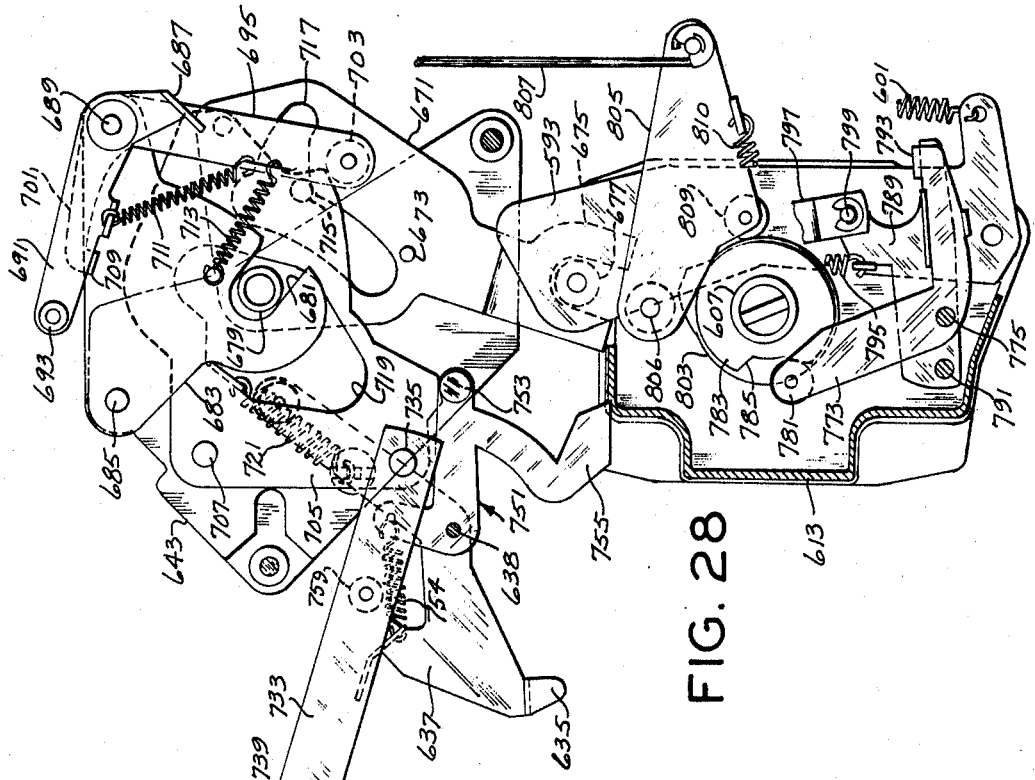
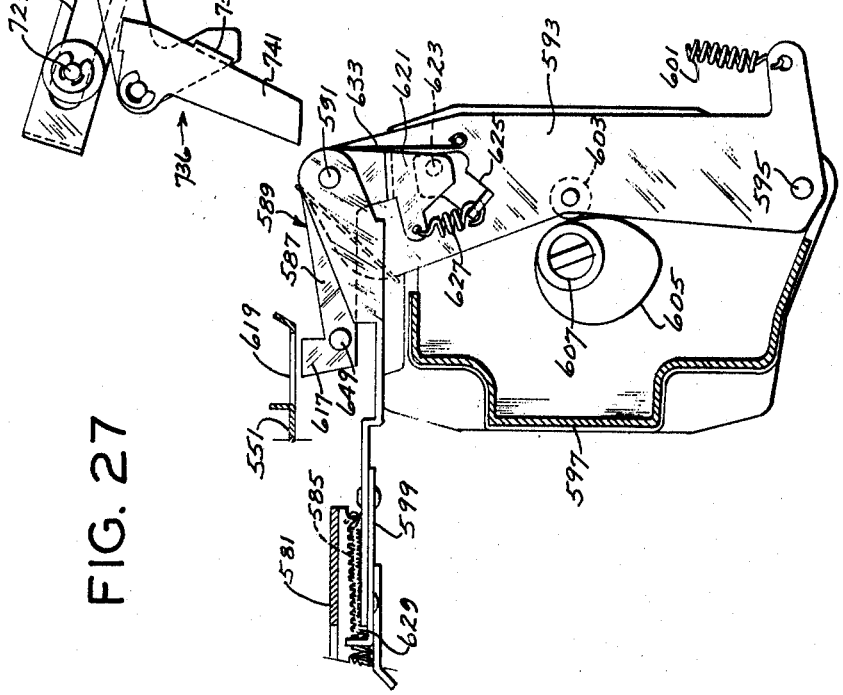
FIG. 28
FIG. 27

United States Patent Office 3,477,556
Patented Nov. 11, 1969

3,477,556
CONTROL AND CHANGE MAKER FOR A VENDOR
James T. Schuller, St. Ann, Harry C. Haeusser, St. Louis County, and Barry L. Smith, Florissant, Mo., assignors to UMC Industries, Inc., St. Louis, Mo., a corporation of Delaware
Filed Oct. 23, 1967, Ser. No. 677,380
Int. Cl. G07f 5/08, 9/00
U.S. Cl. 194—17                                    36 Claims

ABSTRACT OF THE DISCLOSURE

A coin-handling and change-making unit for controlling the operation of a vending machine for vending items at different prices and for making change in accordance with the amount in coin deposited in the machine and the price of an item selected by a purchaser. The unit is adapted to accept nickels, dimes, quarters and half-dollars and to escrow deposited coins for return prior to a purchase. It has nickel and dime change tubes, nickels deposited in the unit being fed to the nickel tube for maintaining a supply of nickels for change. The dime tube is a preloaded tube. Provision is made for nickel and dime payback in change as long as there is a supply of dimes in the dime tube, with automatic switch-over from nickel and dime payback to all-nickel payback when the supply of dimes in the dime tube is depleted. The unit has dual credit registers for vending at two different prices, and these are automatically reset on a vend for acceptance of coins and registration of credit for a subsequent vend while change is being issued. Half dollars are escrowed on edge separately from nickels, dimes and quarters.

BACKGROUND OF THE INVENTION

The invention is in the field of controls and change makers for vendors, i.e., devices for controlling the operation of a vendor to permit a vend only on deposit of an amount equal to or over the price of an item to be vended, and, in the case of deposit of an amount over the price, for issuing coin in change in appropriate amount.

Devices of this general class have been on the market, but have not completely solved a number of problems, including:

(A) The problem of delay, upon a vend, in being able to accept money for a subsequent vend until the change maker of the device has completed its operation of issuing coins in change. In this regard, it is to be noted that it is desirable on many vendor locations that purchasers be able to deposit money in the vendor and obtain their purchases as fast as possible, without having to wait for completion of operation of the change maker before being able to deposit money.

(B) The problem of depletion of the supply of coins in the change maker, with attendant reduction in the number of vends possible before purchases can be made only by deposit of the exact price only. Efforts have been made to solve this by providing for issue of change in coins of two denominations (e.g., nickels and dimes) and by feeding coins of one of these denominations (e.g., nickels) deposited in the vendor to stock the change maker, but even these have not been wholly satisfactory. For example, in the case of devices which issue both nickels and dimes in change, the dime supply may be a preloaded supply, and when the supply of dimes is depleted, purchases can be made only by deposit of the exact price, even though there may be nickels in stock.

(C) The problem of handling vending items at different prices, with appropriate issue of change as regards the price of the item selected and the amount deposited.

(D) The problem of handling coins of several denominations, including half dollars, and providing for escrowing the deposited coins so that a depositor may, if desired, obtain return of his coins prior to a purchase, without unduly increasing the size of the device, noting that half dollars are of relatively large diameter.

SUMMARY OF THE INVENTION

An object of the present invention is the provision of a control and change maker for a vendor which enables immediate acceptance, upon a vend, of money for a subsequent vend before the change maker has completed its operation of issuing coins in change. In general, this is accomplished by providing a credit register which controls both the vendor and the change maker, the credit register being reset to its zero credit position in response to a vend, operation of the change maker being initiated in response to a vend, whereby money may be deposited in the vendor and the amount thereof registered for a subsequent vend during the operation of the change maker.

A further object of the invention is the provision of a control and change maker for a vendor which enables a greater number of vends with issue of change prior to depletion of the supply of change coins without the use of unduly long change tubes. In general this is accomplished by providing a supply of coins of a unit value, e.g., nickels, and a supply of coins of twice the unit value, e.g., dimes, with an arrangement such that change is issued from both supplies until the supply of coins of twice the unit value is depleted, whereupon change is issued wholly in coins of unit value. Thus, vending with change may continue even after the supply of coins of twice the unit value is depleted, and the supply of coins of unit value may be one that is replenished with coins of unit value deposited in the vendor.

A further object of the invention is the provision of a control and change maker such as described which is adapted to handle the vending of items at different prices, with appropriate issue of change taking into account the price of the item selected by a purchaser and the amount of money deposited by the purchaser. In general, this is accomplished by providing first and second credit registers, the first having control over vending of items of a first price, and the second having control over vending of items of a second price, each register having control over the change maker, and means whereby the change maker is responsive to the first credit register in the case of vending of an item of the first price and responsive to the second credit register in the case of vending of an item of the second price.

A further object of the invention is the provision of a control and change maker adapted to handle all U.S. coins except pennies, including half dollars, and providing for escrowing deposited coins so that a depositor may, if desired, obtain return of his coins before a purchase, without unduly increasing the size and complexity of the device. In general, this is accomplished by providing for escrow of a half dollar deposited in the vendor separately from other coins, with the half dollars escrowed on edge instead of flat, thereby enabling the overall thickness of the device to be kept to a minimum. Other objects and features will be in part apparent and in part pointed out hereinafter.

BRIEF DESCRIPTION OF THE DRAWINGS

FIG. 2 is a rear elevation;

FIG. 3 is a plan of FIG. 2;

FIG. 4 is an elevation of the left side of FIG. 1 (the right side of FIG. 2);

FIG. 5 is an enlarged view of the upper part of FIG. 1 showing a coin totalizer of the apparatus;

FIG. 5A is a fragmentary view showing the upper left corner of FIG. 5 with parts removed;

FIG. 6 is an enlarged view of an intermediate part of FIG. 1 showing escrow mechanism of the apparatus;

FIG. 8 is a horizontal section through the nickel, dime, quarter and half-dollar chutes of the totalizer;

FIG. 9 is a view showing the conformation of the nickel chute;

FIG. 10 is a view showing the conformation of the dime chute;

FIG. 15 is a view of the back of the mechanism shown in FIG. 13;

FIG. 16 is a view showing an escapement wheel of the FIG. 13 mechanism, and other associated components;

FIG. 17 is a view of the back of a stop block shown in FIG. 13;

FIG. 22 is a longitudinal section through the nickel and dime tubes of the change maker;

FIG. 23 is a transverse section through the dime ejector;

FIG. 24 is a transverse section through the nickel ejector;

FIGS. 25–28 are views showing details of the change maker;

Corresponding reference characters indicate corresponding parts throughout the several views of the drawings.

DESCRIPTION OF THE PREFERRED EMBODIMENT

Figure 1:
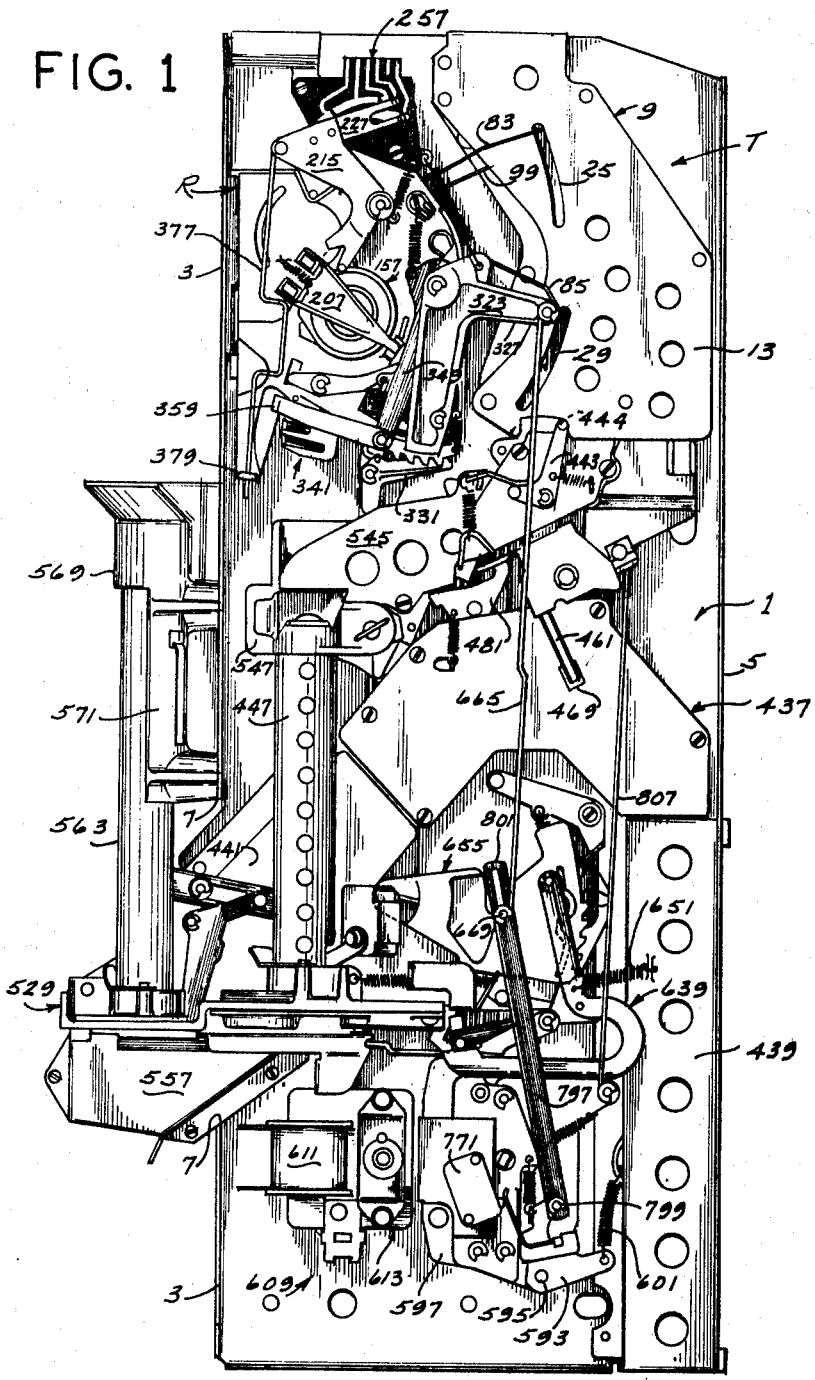
FIG. 1 is a front elevation of a control and change maker apparatus of this invention.

Referring first to FIGS. 1–12 of the drawings, a coin apparatus constructed in accordance with this invention is shown to comprise a main mechanism plate 1 having left and right side flanges 3 and 5. These extend forward from the plate. The left-side flange 3 has a gap at 7. In the space between the flanges toward the upper end of the plate is a coin totalizer unit designated in its entirety by the reference character T which is adapted to totalize the value of coins deposited in the vending machine in which the apparatus is used. This totalizer unit T comprises a coin chute assembly, designated in its entirety by the reference numeral 9, formed to provide a nickel chute NC, a dime chute DC, a quarter chute QC, and a half-dollar chute HC. It will be understood that the vending machine in which the apparatus is used has a slot for insertion of nickels, dimes, quarters and half dollars, coins deposited in the slot being delivered to a conventional coin selector and slug rejector (not shown) which is located above the upper end of the apparatus, and which functions to reject slugs, and to accept nickels, dimes, quarters and half dollars, and to deliver nickels to chute NC, dimes to chute DC, quarters to chute QC, and half dollars to chute HC. The nickel chute NC, the dime chute DC, the quarter chute QC and the half dollar chute HC are arranged in that order from front to rear of the coin chute assembly.

The coin chute assembly 9 comprises a plate 11 (which may be molded of plastic) formed with a channel in its front face to provide the nickel chute NC and a channel in its back face to provide the dime chute DC. A sheet metal plate 13 fastened in front of plate 11 constitutes the front wall of the nickel chute and a sheet metal plate 15 on the back of plate 11 constitutes the back wall of the dime chute. The coin chute assembly further comprises a plate 17 (which may be molded of plastic) formed with a channel in its front face to provide the quarter chute QC and a channel in its back face to provide the half dollar chute HC. A sheet metal plate 19 on the front of plate 17 constitutes the front wall of the quarter chute. The subassembly of plates 11, 13 and 15 (forming the nickel and dime chutes) is mounted on posts 21 which extend forward from plate 17 so as to provide a space between plates 15 and 19. The back of plate 17 engages the main plate 1 so that the latter provides the back wall for the half dollar chute HC.

As shown in FIG. 10, the dime chute DC (formed in the front of plate 11) has an upper passage NC1 which curves toward the right as it proceeds downward. At the lower end of passage NC1, the chute widens, and an island 23 divides the wider portion of the chute into a lefthand lower passage NC2 and a right-hand lower passage NC3. Plates 13 and 11 have an arcuate slot 25 curving down and toward the right from a point adjacent the upper end of passage NC1 and generally in the center of this passage to a point at the left of this passage.

As shonw in FIG. 10, the dime chute DC (formed in the back of plate 11) has an upper passage DC1 which curves toward the right as it proceeds downward, and a lower passage DC2 which curves toward the left as it proceeds downward. This lower passage DC2 of the dime chute DC traverses a portion 27 of the plate 11 which extends to the left beyond the lefthand limit of the nickel chute passage NC2. In this portion of the plate 11 is an arcuate slot 29 which curves down and toward the left from a point adjacent the upper end of the dime chute passage DC2 and generally in the center of this passage to a point at the left of this passage.

Figure 11:
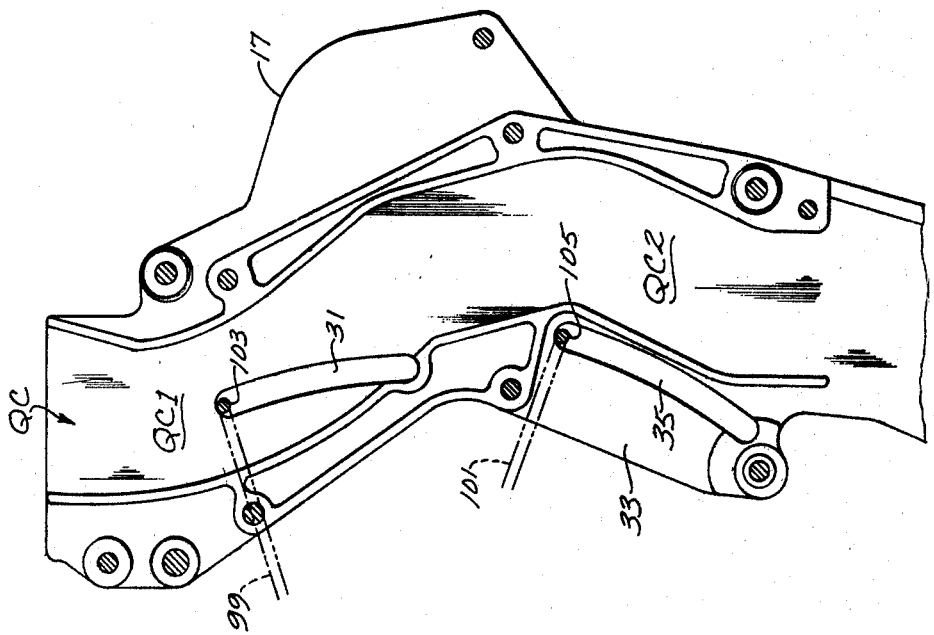
FIG. 11 is a view showing the conformation of the quarter chute.

As shown in FIG. 11, the quarter chute QC (formed in the front of plate 17) has an upper passage QC1 which curves toward the right at it proceeds downward, and a lower passage QC2 which angles toward the left as it proceeds downward. Plates 19 and 17 have an arcuate slot 31 which curves down and toward the right from a point adjacent the upper end of passage QC1 and generally in the center of this passage to a point at the left of this passage.

Figure 12:
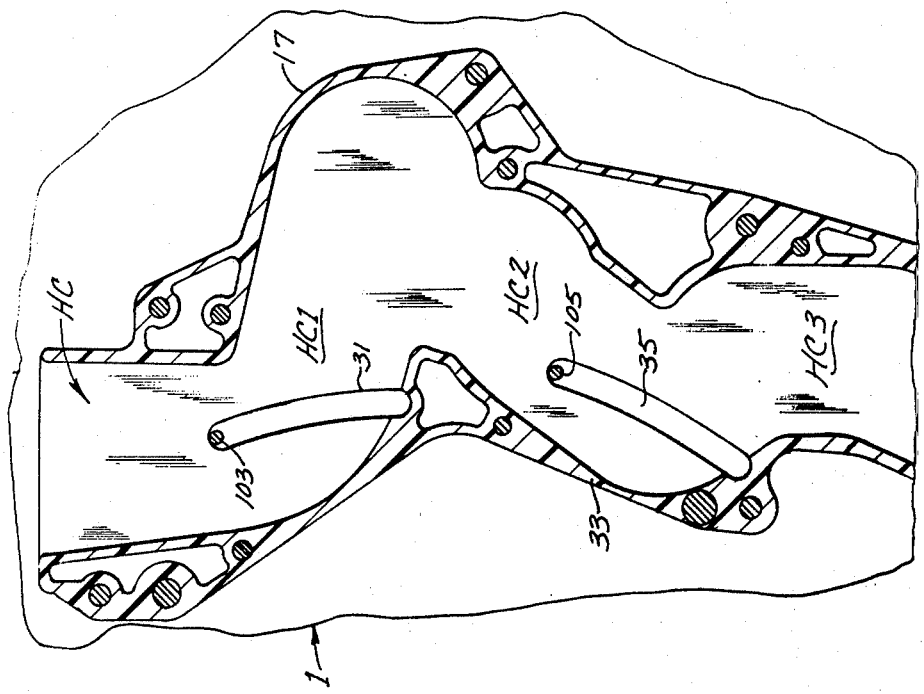
FIG. 12 is a view showing the conformation of the half-dollar chute.

As shown in FIG. 12, the half dollar chute HC (formed in the back of plate 17) has an upper passage HC1 which curves toward the right as it proceeds downward, an intermediate passage HC2 which angles to the left, and a lower passage HC3 which proceeds straight downward and then angles toward the left. Passage HC2 traverses a portion 33 of plate 17 which extends to the left beyond the left-hand limit of the quarter chute passage QC2. In this portion of the plate 17 is an arcuate slot 35 which curves down and toward the left from a point adjacent the upper end of passage HC2 and generally in the center of this passage to a point at the left of this passage.

At the left of the coin chute assembly 9 is mounted a coin-actuated escapement mechanism or recorder R (see particularly FIGS. 5 and 13–16). This comprises an assembly of a casting 37 formed to provide a front plate 39, and a rear plate 41, this assembly being mounted on the front of the main plate 1 with a space between the main plate and the rear plate 41. A shaft 43 carrying a toothed escapement wheel 45 clustered with a pinion 47 (see FIG. 16) is journalled in plates 39 and 41, projecting at its forward end from the front plate 39. A sector gear 49 pivoted at 51 between plates 39 and 41 meshes with the pinion. A lever 53 is pivoted at 51 on the back of plate 41 and has forwardly projecting lugs 57 and 59 straddling an arm 61 on the sector gear. A coil tension spring 63 (see FIG. 16) acts via lever 53 to bias the sector gear to rotate counterclockwise as viewed from the front, thereby biasing the escapement wheel 45 and shaft 43 to rotate clockwise as viewed from the frotn. A pawl 65 pivoted at 67 between the plates 39 and 41 is biased by a spring 69 for engagement of a tooth 71 on the pawl with the escapement wheel releasably to hold the wheel against forward (clockwise) rotation under the spring bias. The wheel is rotatable rearward (counterclockwise) against the spring bias to what is referred to as a zero position shown in FIG. 16. The wheel has a number of half teeth indicated at 45a, and the zero position is determined by latching of the pawl behind the first full tooth of the series of full teeth of the wheel. A projection 73 on the back of the wheel is engageable with a stop 75 struck forward from rear plate 41 to prevent the wheel from rotating too far clockwise or counterclockwise.

An escapement lever 77 is pivoted at 79 between plates 39 and 41. This lever is provided on the back with a pallet 81 adapted for engagement with the teeth of the escapement wheel. Extending to the right from the lever in front of the coin chute assembly are two trip wires 83 and 85, disposed at an angle to one another, wire 83 being above wire 85. Wire 83 has a finger 87 at its right end which extends into slot 25 and which reaches across nickel chute passage NC1 into the dime chute passage DC1. Wire 85 has a finger 89 at its right end which reaches through slot 29 across the dime chute passage DC2 below finger 87. Lever 77 is biased by a hairspring 91 to rotate counterclockwise as viewed from the front to the retracted position illustrated in FIG. 16 determined by engagement of fingers 87 and 89 with the upper ends of slots 25 and 29. In this retracted position of the lever, the pallet 81 is clear of the wheel. On clockwise swing of the lever, pallet 81 swings down between two teeth of the wheel. The lever has an arm 93 engageable with the pawl 65 to release the latter when the lever swings down from its FIG. 16 retracted position. The arrangement is such that when the lever swings down to enter pallet 81 between two teeth of wheel 45 and to release the pawl 65 (thereby permitting the wheel to escape clockwise under the bias of spring 63), the wheel escapes forward (clockwise) a fraction of the tooth spacing and then, when the lever is returned upward (counterclockwise) to its retracted position by the hairspring 91, the wheel escapes the remainder of the tooth spacing. Thus, on a downward swing of the trip wires 83, 85 and a return upward swing thereof, the wheel escapes forward (clockwise) one tooth spacing, referred to as a one-step escape of the wheel.

Downward swing of the trip wires occurs in response to passage of a nickel through the nickel chute passage NC1 or a dime through the dime chute passage DC1. A nickel passing down through passage NC1 engages the finger 87 on the end of the upper trip wire 83, swings this wire down, and then passes on by to release the wire 83 to swing back upward. This effects a one-step escape of the escapement wheel 45 and shaft 43. A dime passing down through passage DC1 engages the finger 87 on the end of the upper trip wire 83, swings this down, then passes on by to release wire 83 to swing upward, effecting a one-step escape of wheel 45 and shaft 43, then engages the finger 89 on the end of the lower trip wire 85, swings this down, then passes on by to release wire 85 to swing upward, effecting a second one-step escape of the wheel 45 and shaft 43. Thus, the effect of passage of a dime through passage DC1 is a two-step escape of the wheel and shaft.

A lever 95 is pivoted at 97 on the back of plate 41 (see FIG. 15). Extending to the right from lever 95 are two trip wires 99 and 101 disposed at an angle to one another, wire 99 being above wire 101. Trip wire 99 reaches into the space between plates 15 and 19 of the coin chute assembly and has a finger 103 at its right end which reaches through slot 31 across the upper passage QC1 of quarter chute QC and the upper passage HC1 of the half-dollar chute HC. Trip wire 101 extends in front of portion 33 of plate 17 of the coin chute assembly and has a finger 105 at its right end which reaches through slot 35 across passage HC2 of the half-dollar chute. A spring 107 biases lever 95 and wires 99 and 101 to rotate counterclockwise as viewed from the front (clockwise as viewed from the rear in FIG. 15) to a raised retracted position determined by engagement of fingers 103 and 105 on the wires with the upper end of slots 31 and 35. Lever 95 carries a pin 109 which extends through a slot 111 in one end of an L-shaped lever 113 pivoted at its other end as indicated at 115 on the back of plate 41. The pin 109 extends forward through an opening 117 in plate 41 in front of the pawl 65. An escapement arm 119 is pivoted at 121 at the knee of lever 113 and extends therefrom toward the left as viewed from the rear in FIG. 15. At its free end, arm 119 has a finger 123 reaching forward through an arcuate notch 125 in plate 41. A spring 127 attached at one end to lever 113 and at its other end to the arm 119 biases the arm to swing upward on its pivot 121 on lever 113. The parts normally occupy the position shown in FIGS. 15 and 16 wherein finger 123 is clear of the escapement wheel 45 and engages the upper edge 125a of notch 125.

A quarter passing down through the passage QC1 of the quarter chute QC engages finger 103 on the end of the upper trip wire 99, swings this wire down, and then passes on by to release the wire to swing back upward. Lever 95, swinging counterclockwise as viewed in FIG. 15 when wire 99 swings down, swings lever 113 clockwise as viewed in FIG. 15. This pulls the escapement arm 119 inward toward the wheel 45 to cause the finger 123 on the end of the escapement arm 119 to engage between two teeth of the escapement wheel. Also, via pin 109, it releases the pawl 65. The escapement wheel is thereupon rotated forward (clockwise as viewed in FIG. 16) under the bias of spring 63. With finger 123 on arm 119 engaged between two teeth of the escapement wheel, arm 119 is swung downward on its pivot. This continues until finger 123 strikes a stop 129 at the lower end of notch 125, this stop being located to stop the finger and the wheel after escape of the wheel through four plus a fraction steps, and then allowing the pawl 65 to catch the fifth tooth for a five-step escape of the wheel and shaft 43. At this point, wire 99 being released to swing back upward, lever 95 swings back clockwise as viewed in FIG. 15, and pin 109 on lever 95 acts on lever 113 to shift arm 119 to move finger 123 outward clear of the wheel. This permits arm 119 to swing back upward to its retracted position of FIGS. 15 and 16 wherein the finger 123 engages the upper end 125a of the notch 125. The effect of this is to release pawl 65 for latching engagement with the wheel.

A half dollar passing down through passage HC1 of the half-dollar chute engages finger 103 on the end of the upper trip wire 99, swings this down, then passes on by to release wire 99 to swing upward, effecting a five-step (25¢) escape of the wheel 45. Then it engages the finger 105 on the end of the lower trip wire 101, swings this down, then passes on by to release wire 101 to swing upward, effecting a second fivestep (25¢) escape of the wheel 45. Thus, the effect of passage of a half dollar through the half-dollar chute is a ten-step (50¢) escape of the wheel and shaft 43.

Means is provided for resetting the shaft 43 and escapement wheel 45 to the zero position either on a purchase or on operation of a coin return bar 131 (see FIG. 2) after deposit of a coin or coins and before a purchase. This reset means includes a recorder reset lever 133 pivoted at 135 in front of the main plate 1 carrying a reset roller 137 engageable with the lever 53 of the recorder. Reset lever 133 is biased toward the retracted position in which it appears in FIG. 16 by a spring 139. It carries a follower roller 141 which extends rearward through an arcuate slot 143 in the main plate 1. The coin return bar 131 is mounted for vertical sliding movement on the back of the main plate by means of studs 145 and 147 extending rearward from the main plate through elongate vertical slots 149 and 151 in the bar. The coin return bar is biased by a spring 153 to a raised retracted position determined by engagement of the lower ends of the slots 149, 151 with the studs 145, 147. It has a cam edge 155 engageable on downward movement thereof with roller 141 on reset lever 133 for swinging the latter in counterclockwise direction as viewed from the front away from its retracted position. On such swing of the reset lever, its roller 137 engages lever 53 of the recorder to swing lever 53 to the left, thereby rotating sector gear 49 in clockwise direction as viewed in FIG. 16. The sector gear thereupon rotates the escapement wheel 45 and shaft 43 counterclockwise for reset to zero position. The escapement wheel becomes latched in its zero position by pawl 65. The recorder reset lever 133 is also swung counterclockwise from its retracted position to reset the escapement wheel and shaft 43 on a purchase, in a manner to be subsequently described.

Removably mounted on the forward end of the recorder shaft 43, and rotatable with shaft 43, is a price disk assembly generally designated 157 (see FIGS. 1, 5 and 29–31). This comprises a cylindric hub 159, closed at its outer (forward) end having a bore 161 receiving the shaft, and a head 163 adjacent its rearward end. The closed end of the hub is formed with a semicircular recess 165 receiving a semi-circular forward end extension 167 of the shaft 43 for keying the hub on the shaft. The head 163 is formed on its forward face with an annular series of crown coupling teeth 169, spaced at intervals corresponding to the teeth of the escapement wheel 45 representing 5¢ increments. On the rear face of the head is a price-setting scale 171, having markings 173 at 10¢ intervals and markings 175 at intermediate 5¢ intervals, and covering the range of prices from 5¢ to 75¢ in 5¢ increments. The 5¢ marking is coplanar with the flat side of the recess 165.

On the hub in front of head 163 are carried first and second price disks D1 and D2, D1 being in front of D2. These disks are axially slidable and rotatable on the hub. The rearward price disk D2 has a series of crown coupling teeth 177 on its rear face interengageable with the teeth 169 on the head 163, and a corresponding series of crown coupling teeth 179 on its front face. The forward price disk D1 has a corresponding serise of crown coupling teeth 181 on its rear face interengageable with teeth 179. The disks are biased to slide rearward on the hub toward the head 163 by a spring 183 reacting from a collar 184 on the forward end of the hub. The collar 184 and the head 163 are axially spaced on the hub sufficiently to allow the disks to be slid forward on the hub against the bias of the spring for disengagement of teeth 177 from teeth 169 and for disengagement of teeth 181 from teeth 179, so as to permit rotary adjustment of the disks on the hub to different angular positions on the hub corresponding to different price settings, after which the disks are allowed to slide rearward on the hub under the bias of spring 183 for interengagement of the crown coupling teeth to lock the disks in adjusted position on the hub.

The first price disk D1 has a peripheral notch 185 and a radial ear 187 projecting outward at the trailing side of this notch. The shoulder at the trailing side of this notch and along the leading side of this ear is designated 189. A pin 191 extends forward from the ear 187. Similarly, the second price disk D2 has a peripheral notch 195 and a radial ear 197 projecting outward at the trailing side of this notch. The shoulder at the trailing side of this notch and along the leading side of this ear is designated 199. A pin 201 extends rearward from ear 197. On the back of disk D1 is an index mark 203 which, in adjusting disk D1 to a given price setting on the hub 159, is set in radial alignment with the respective price marking of the scale 171. On the back of disk D2 is a similar index mark 205.

A keeper 207 is provided for holding the price disk assembly on the end of the recorder shaft 43. This is pivoted at 209 at the ends of a pair of brackets 211 extending forward from recorder plate 39 for movement between a closed position engaging the forward end of the hub 159 to keep the hub from sliding off the shaft 43 and an open position for removal of the price disk assembly. An overcentering spring 213 biases the keeper closed when it is swung overcenter to the right, and holds it open when it is swung overcenter to the left.

The above-described arrangement is such that each of the price disks D1 and D2 rotates with shaft 43 clockwise as viewed from the front of the apparatus through a one-step interval (one step corresponding to the spacing of teeth of the escapement wheel 45 and also the spacing of the teeth on the price disks and the head 163 on the hub 159) for each 5¢ deposited in the vending machine, i.e., one step for each nickel, two steps for each dime, five steps for each quarter, ten steps for each half dollar. Disk D1 controls a first credit lever 215 and disk D2 controls a second credit lever 217 both pivoted on a pin 219 extending forward from the front plate 39 of the recorder R. Credit lever 215 is made of electrical insulating material, and has an arm 221 angled downward toward the left from pin 219 carrying a follower 223 engageable with the periphery of disk D1, and an arm 225 angled upward toward the left carrying an electrically conductive electrical contact wiper arm 227. It is biased by a spring 229 to swing counterclockwise on pin 219 for engagement of follower 223 with the periphery of disk D1. Arm 221 has left-hand and right-hand fingers 231 and 233 at its lower end, with a notch 235 between these fingers. Follower 223 projects rearward from finger 233 adjacent its lower end. Credit lever 217 is similar to lever 215, also being made of electrical insulation material, and having an arm 241 angled downward toward the left from the pin 219 carrying a follower 243 engageable with the periphery of disk D2, and an arm 245 angled upward toward the left carrying an electrically conductive electrical contact wiper arm 247, and is biased by a spring 249 to swing counterclockwise on pin 219 for engagement of follower 243 with the periphery of disk D2. Arm 241 has left-hand and right-hand fingers 251 and 253 at its lower end, with a notch 255 between these fingers. Follower 243 projects forward from finger 253.

The wiper arm 227 on credit lever 215 has two contact fingers 227a and 227b slidable over the front face of a printed circuit board 257 mounted on the casting 37. A circuit printed on the front face of this board comprises an elongate arcuate contact 259 engageable by finger 227b throughout its range of movement, and an arcuate series of four contacts 261, 263, 265 and 267 engageable by finger 227a, with a terminal connection 269 extending from contact 259, and terminal connections 273, 275, 277 and 279 extending from contacts 261, 263, 265 and 267. Contacts 261 and 263 are spot contacts; contact 265 is an elongate contact. The wiper arm 247 on credit lever 217 has two contact fingers 247a and 247b slidable over the rear face of the circuit board 257. A circuit identical to that on the front face of the board printed on the rear face of the board, comprising an elongate arcuate contact 289 engageable by finger 247b throughout its range of movement, and an arcuate series of four contacts 291, 293, 295 and 297 engageable by finger 247a, with terminal connections 299, 301, 303, 305, 307 extending from contacts 289, 291, 293, 295 and 297.

Figure 13:
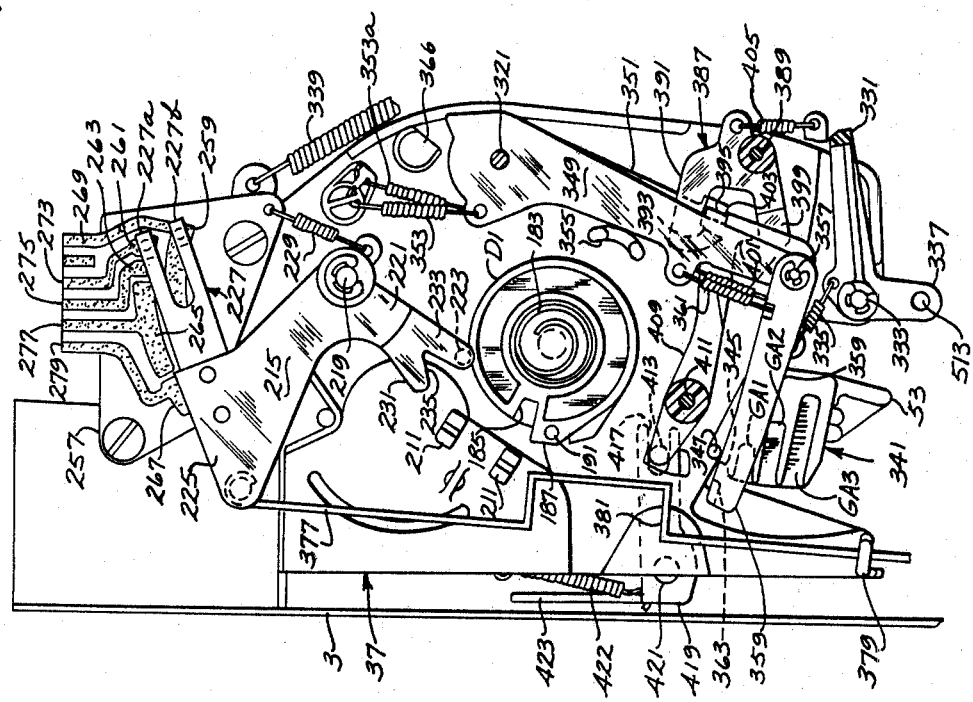
FIG. 13 is a fragment of FIG. 5 showing a coin-actuated escapement mechanism of the apparatus, with certain parts removed.
Figure 18:
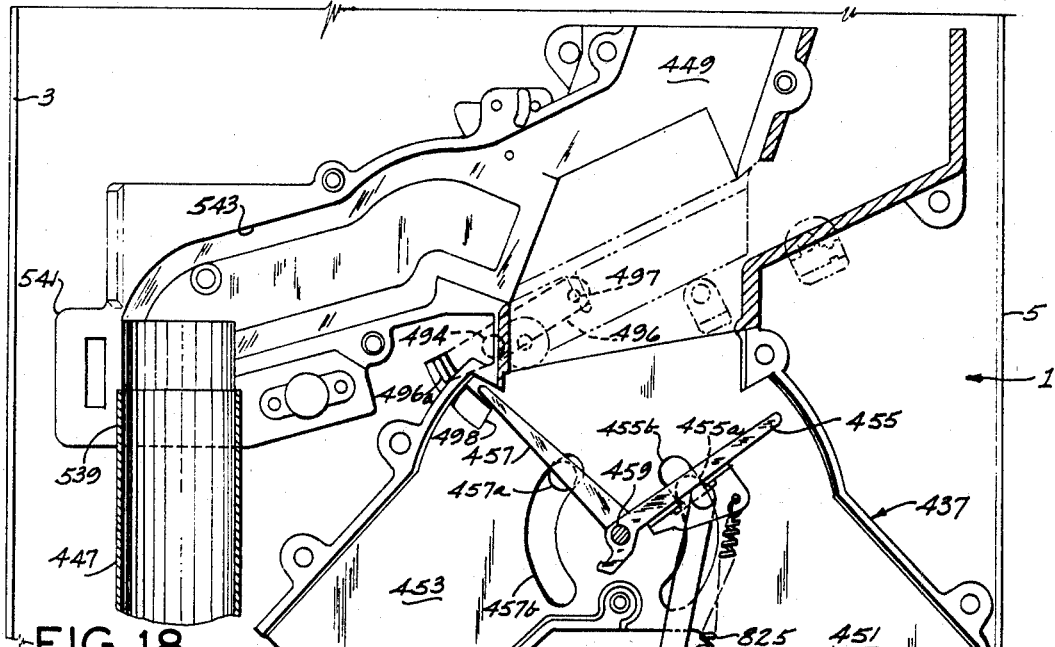
FIG. 18 is a view of an escrow hopper with the front thereof removed.

Credit lever 215 is swingable stepwise in counterclockwise direction on pin 219 from the retracted position in which it appears in FIGS. 5 and 13 wherein contact finger 227a is on contact 261, to an exact price position wherein contact finger 227a is on contact 263, a 5¢ over exact price position wherein contact finger 227a is on contact 265, a 10¢ over exact price position wherein contact finger 227a is a step farther along contact 265, a 15¢ over exact price position wherein contact finger 227a is another step farther along contact 265, a 20¢ over exact price position wherein contact finger 227a is still another step farther along contact 265, and an end limit position wherein contact finger 227a is on contact 267.

Similarly, credit lever 217 is swingable stepwise in counterclockwise direction on pin 219 from the retracted position in which it appears in FIG. 17 wherein contact finger 247a is on contact 291, to an exact price position wherein contact finger 247a is on contact 293, a 5¢ over exact price position wherein contact finger 247a is on contact 295, a 10¢ over exact price position wherein contact finger 247a is a step farther along contact 295, a 15¢ over exact price position wherein contact finger 247a is another step farther along contact 295, a 20¢ over exact price position wherein contact finger 247a is still another step farther along contact 295, and an end limit position wherein contact finger 247a is on contact 297.

Figure 14:
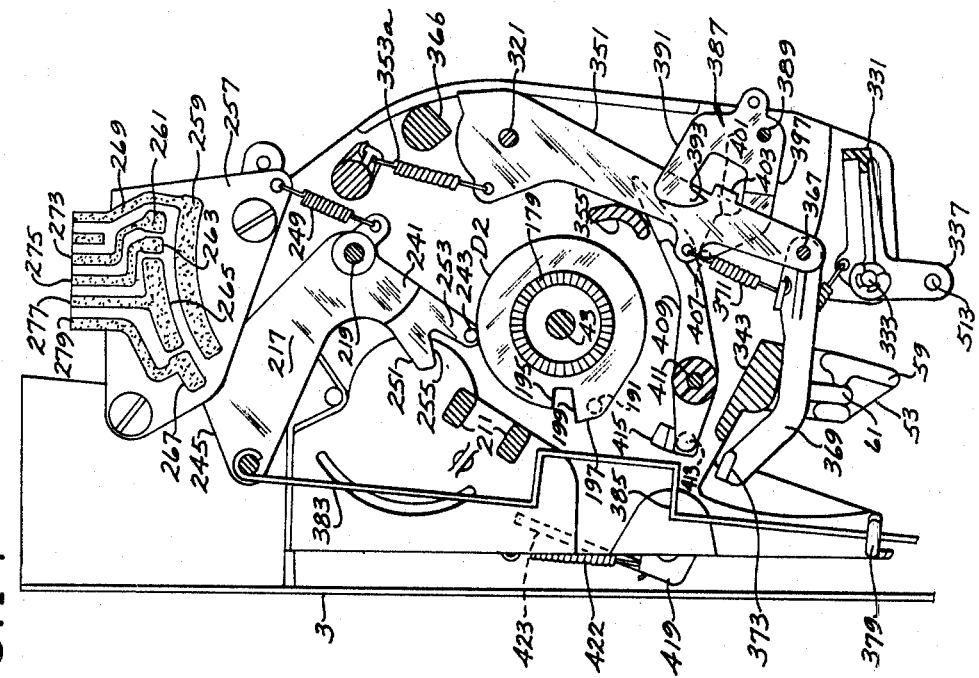
FIG. 14 is a view similar to FIG. 13 with parts further removed, and showing a moved position of certain parts.

When escapement wheel 45 and shaft 43 are in their zero position, the price disks D1 and D2 occupy a corresponding zero position such as shown in FIGS. 13 and 14 wherein the notches 185 and 195 in the disks trail the followers 223 and 243 on the credit levers 215 and 217 a predetermined number of 5¢ steps corresponding to the prices set on the disks. Thus, if the price set on disk D1 is P1 cents, and the price set on disk D2 is P2 cents, when the disks are in zero position, notch 185 in disk D1 trails follower 223 on credit lever 215 P1/5 steps, and notch 195 in disk D2 trails followers 243 on credit lever 217 P2/5 steps.

On deposit of P1 cents, which is the price set on disk D1, disk D1 rotates forward (clockwise) P1/5 steps from the zero position, bringing notch 185 under follower 223, whereupon the follower 223 drops into notch 185 with accompanying counterclockwise swing of credit lever 215 to its exact price position to move contact finger 227a off contact 261 and onto contact 263. This sets up an electrical signal that coin in the amount of price P1 set on disk D1 has been deposited, and conditions the apparatus for the vending of an item selling at the price P1 without issuing any change, as will appear.

On deposit of P1+5 cents, which is 5¢ more than the price set on disk D1, disk D1 rotates forward P1/5+1 steps from the zero position. At the P1/5 step, the follower 223 drops into notch 185 with accompanying counterclockwise swing of credit lever 215 to move contact finger off contact 261 onto contact 263. On subsequent rotation of disk D1 from the P1/5 step to the P1/5+1 step credit lever 215 is swung farther counterclockwise to its 5¢ over exact price position to move contact finger 227a off contact 263 onto contact 265. This conditions the apparatus for the vending of an item selling at price P1 and issuing 5¢ (a nickel) in change, as will appear.

On deposit of P1+10 cents, which is 10¢ more than the price set on disk D1, disk D1 rotates forward P1/5+2 steps from the zero position. At the P1/5 step, the follower 223 drops into notch 185 with accompanying counterclockwise swing of credit lever 215 to move contact finger 227a off contact 261 onto contact 263. On subsequent rotation of disk D1 from the P1/5 step to the P1/5+1 step, lever 215 is swung farther counterclockwise and moves contact finger 227a off contact 263 onto contact 265. On subsequent rotation of disk D1 from the P1/5+1 step to the P1/5+2 step, lever 215 is swung still farther counterclockwise to its 10¢ over exact price position with contact finger 227a still on contact 265. This conditions the apparatus for the vending of an item selling at price P1 and issuing 10¢ in change, as will appear.

On deposit of P1+15¢, which is 15¢ more than the price set on disk D1, disk D1 rotates forward P1/5+3 steps from the zero position. This results in swinging of credit lever 215 to its 15¢ over exact price position, wherein contact finger 227a is on contact 265, and conditions the apparatus for the vending of an item selling at price P1 and issuing 15¢ in change, as will appear.

On deposit of P1+20¢, which is 20¢ more than the price set on disk D1, disk D1 advances P1/5+4 steps from the zero position. This results in swinging of credit lever 215 to its 20¢ over exact price position, wherein contact finger 227a is still on contact 265, and conditions the apparatus for the vending of an item selling at price P1 and issuing 20¢ in change, as will appear.

On deposit of P1+25¢ or more, disk D1 advances P1/5+5 or more steps from the zero position, the shoulder 189 and ear 187 of the disk passing on by the follower 223 on credit lever 215, and this lever is swung to its end limit position wherein contact finger 227a is off contact 265 and on the end contact 267.

On deposit of P2 cents, which is the price set on disk D2, disk D2 rotates forward (clockwise) P2/5 steps from the zero position, bringing notch 195 under follower 243, whereupon the follower 243 drops into notch 195 with accompanying counterclockwise swing of credit lever 217 to its exact price position to move contact finger 247a off contact 291 and onto contact 293. This sets up an electrical signal that coin in the amount of price P2 set on disk D2 has been deposited, and conditions the apparatus for the vending of an item selling at the price P2 without issuing any change, as will appear.

On deposit of P2+5 centes, which is 5¢ more than the price set on disk D2, disk D2 rotates forward P2/5+1 steps from the zero position. At the P2/5 step, the follower 243 drops into notch 195 with accompanying counterclockwise swing of credit lever 217 to move contact finger 247a off contact 291 onto contact 293. On subsequent rotation of disk D2 from the P2/5 step to the P2/5+1 step, credit lever 217 is swung farther counterclockwise to its 5¢ over exact price position to move contact finger 247a off contact 293 onto contact 295. This conditions the apparatus for the vending of an item selling at price P2 and issuing 5¢ (a nickel) in change, as will appear.

On deposit of P2+10 cents, which is 10¢ more than the price set on disk D2, disk D2 rotates forward P2/5+2 steps from the zero position. At the P2/5 step, the follower 243 drops into notch 195 with accompanying counterclockwise swing of credit lever 217 to move contact finger 247a off contact 291 onto contact 293. On subsequent rotation of disk D2 from the P2/5 step to the P2/5+1 step, lever 217 is swung farther counterclockwise and moves contact finger 247a off contact 293 onto contact 295. On subsequent rotation of disk D2 from the P2/5+1 step to the P2/5+2 step, lever 217 is swung still farther counterclockwise to its 10¢ over exact price position with contact finger 247a still on contact 295. This conditions the apparatus for the vending of an item selling at price P2 and issuing 10¢ in change, as will appear.

On deposit of P2+15¢, which is 15¢ more than the price set on disk D2, disk D2 rotates forward P2/5+3 steps from the zero position. This results in swinging of credit lever 217 to its 15¢ over exact price position, wherein contact finger 247a is on contact 295, and conditions the apparatus for the vending of an item selling at price P2 and issuing 15¢ in change, as will appear.

On deposit of P2+20¢, which is 20¢ more than the price set on disk D2, disk D2 advances P2/5+4 steps from the zero position. This results in swinging of credit lever 217 to its 20¢ over exact price position, wherein contact finger 247a is still on contact 295, and conditions the apparatus for the vending of an item selling at price P2 and issuing 20¢ in change, as will appear.

On deposit of P2+25¢ or more, disk D2 advances P2/5+5 or more steps from the zero position, the shoulder 199, and ear 197 of the disk passing on by the follower 243 on credit lever 217, and this lever is swung to its end limit position wherein contact finger 247a is off contact 295 and on the end contact 297.

From the above it will appear that disk D1 constitutes a first credit register which is movable away from a zero credit position in response to deposit of money in the vendor for registering the amount deposited, and that it is movable to a first exact price position corresponding to the price P1 of an item or items to be vended and beyond the exact price position to one of four change positions, calling for issue of 5¢, 10¢, 15¢ or 20¢ in change. Simiarly, disk D2 constitutes a second credit register movable with the first credit register D1 away from the zero credit position to a second exact price position corresponding to the price P2 of another item or other items to be vended and beyond the second exact price position to one of four change positions calling for issue of 5¢, 10¢, 15¢ or 20¢ in change.

A pin 321 extends forward from plate 39 to the right of and slightly above the price disks D1, D2. Pivoted on this pin is an escapement lever 323 having an arm 325 extending downward from the pin and an arm 327 extending toward the right from the pin. Arm 325 has a five-tooth ratchet 329 at its lower end. The teeth of this ratchet are designated a, b, c, d and e in order from right to left, a being referred to as the first tooth, b, as the second tooth, etc. A pawl 331 pivoted at 333 on the casting 37 is biased by a spring 335 toward engagement with the ratchet. This pawl has a downwardly extending tail 337. The lever 323 is biased to swing counterclockwise on pin 321 by a spring 339, and is normally held in a retracted position against the bias of this spring by interengagement of the pawl with the first tooth a of the ratchet, as shown in FIG. 5.

Means is provided for controlling the escape of lever 323 (i.e., counterclockwise swing of the lever under the bias of spring 339) on release of the pawl 331 in accordance with the extent of movement of credit levers 215 and 217 in response to deposit of coin, and in accordance with selection by a purchaser of an item of price P1 or an item of price P2. As shown in FIGS. 5, 13 and 17, this means comprises a stop block 341 extending downward from a flange 343 which projects forward at the lower edge of the casting 37. This block has a curved shoulder 345 at its upper left corner, three grooves GA1, GA2 and GA3 in its front face extending inward from its left-hand side, three corresponding grooves GB1, GB2 and GB3 in its rear face extending inward from is left-hand side, and a stud 347 projecting forward at its upper left corner above the shoulder. Grooves GA2 and GB2 are longer than grooves GA1 and GB1; grooves GA3 and GB3 are longer than grooves GA2 and GB2. Grooves GA1 and GB1 are referred to as 5¢ change grooves; grooves GA2 and GB2 are referred to as 10¢ change grooves; and grooves GA3 and GB3 are referred to as 15¢ change grooves.

Pivoted on pin 321 in back of ratchet lever 323 are two levers 349 and 351, lever 351 being spaced rearward of lever 349. Lever 349 is biased by a spring 353 to swing clockwise on pin 321, its clockwise swing being limited by its engagement with a stop 355 extending forward from the casting. A pin 357 extends forward at the lower end of lever 349. Pivoted on this pin is a drag arm 359 which extends toward the left in front of the stop block 341. This arm is biased by spring 361 connected to lever 349 to swing upward on pin 357 to an upper retracted position, referred to as its no-change position, determined by its engagement with stud 347. The arm extends to the left beyond the stop block and, at its left end, has a rearwardly extending finger 363 adapted to enter grooves GA1, GA2 and GA3. When the arm is in its upper retracted position (its no-change position) engaging stud 347, on counterclockwise swing of lever 349, arm 359 is dragged toward the right to the point where finger 363 engages shoulder 345.

The arm 359 is swingable downward to a 5¢ change position bringing finger 363 into line with the first groove GA1 whereupon, on counterclockwise swing of lever 349, arm 359 is dragged toward the right to the point where finger 363 engages the right end of this groove. The arm 359 is swingable farther downward to a 10¢ change position wherein the finger 363 is aligned for entry into the second groove GA2 whereupon, on counterclockwise swing of the lever 349, the arm 359 is dragged toward the right to the point where finger 363 engages the right end of the second groove GA2. The arm 359 is swingable still farther downward to a 15¢ change position wherein the finger 363 is aligned for entry into the third groove GA3 whereupon, on counterclockwise swing of the lever 349, the arm 359 is dragged toward the right to the point where fingers 363 engages the right end of the third groove GA3. The arm 359 is swingable still farther downward to a 20¢ change position wherein finger 363 is completely below the stop block 341 whereupon, on counterclockwise swing of lever 349, finger 363 moves to the right below the block 341, lever 323 swinging counterclockwise to the point where it engages a stop 369.

From the above, it will apear that when lever 349 swings to the right with arm 359 in its no-change position, lever 323 swings only through a short arc as determined by engagement of finger 363 with shoulder 345 to a no-change position. When lever 349 swings to the right with arm 359 in its 5¢ change position, lever 323 swings farther to a 5¢ change position as determined by engagement of finger 363 with the right end of the 5¢ change groove GA1. When lever 349 swings to the right with arm 359 in its 10¢ change position, lever 323 swings farther to a 10¢ change position as determined by engagement of finger 363 with the right end of the 10¢ change groove GA2. When lever 349 swings to the right with arm 359 in its 15¢ change position, lever 323 swings farther to a 15¢ change position as determined by engagement of finger 363 with the right end of the 15¢ change groove GA3. When lever 349 swings to the right with arm 359 in its 20¢ change position as determined by finger 363 passing under the stop block 341, lever 323 swings still farther to a 20¢ change position determined by its engagement with stop 366.

A pin 367 extends rearward from the lower end of lever 351. Pivoted on this pin is a drag arm 369 which extends toward the left in back of the stop block 341. This arm 369 is biased by a spring 371 connected to lever 351 to swing upward on pin 367 to an upper retracted position, referred to as its no-change position, determined by its engagement with flange 343 (see FIG. 14). Arm 369 extends to the left beyond the stop block 341 and, at its left end, has a forwardly extending finger 373 adapted to enter grooves GB1, GB2 and GB3. When arm 369 is in its upper retracted position (its no-change position) engaging flange 343, on counterclockwise swing of lever 351, arm 369 is dragged toward the right to the point where finger 373 engages shoulder 345.

The arm 369 is swingable downward to a 5¢ change position bringing finger 373 into line with groove GB1 whereupon, on counterclockwise swing of lever 351, arm 369 is dragged toward the right to the point where finger 373 engages the right end of this grove. The arm 369 is swingable farther downward to a 10¢ change position wherein finger 373 is aligned for entry into groove GB2 whereupon, on counterclockwise swing of the lever 351, the arm 369 is dragged toward the right to the point where finger 373 engages the right end of groove GB2. The arm 369 is swingable still farther downward to a 15¢ change position wherein the finger 373 is aligned for entry into the third groove GB3 whereupon, on counterclockwise swing of the lever 351, the arm 369 is dragged toward the right to the point where finger 373 engages the right end of groove GB3. The arm 369 is swingable still farther downward to a 20¢ change position wherein the finger 373 is completely below the stop block 341 whereupon, on counterclockwise swing of the lever 351, finger 373 moves to the right below the block, lever 323 swinging counterclockwise to the point where it engages stop 367. Lever 351 is biased to swing clockwise by a spring 353a.

Thus, when lever 351 swings to the right with arm 369 in its no-change position, lever 323 swings only through a short arc, as determined by engagement of finger 373 with shoulder 345, to a no-change position. When lever 351 swings to the right with arm 369 in its 5¢ change position, lever 323 swings farther to a 5¢ change position as determined by engagement of finger 373 with the right end of the 5¢ change groove GB1. When lever 351 swings to the right with arm 369 in its 10¢ change position, lever 323 swings farther to a 10¢ change position as determined by engagement of finger 373 with the right end of the 10¢ change groove GB2. When lever 351 swings to the right with arm 369 in its 15¢ change position, lever 323 swings farther to a 15¢ change position as determined by engagement of finger 373 with the right end of the 15¢ change groove GB3. when lever 351 swings to the right with arm 369 in its 20¢ change position as determined by finger 373 passing under the stop block, lever 323 swings still farther to a 20¢ change position determined by its engagement with stop 367.

Lever 215 controls the positioning of drag arm 359 in accordance with the change requirements on deposit of coin and purchase of an item selling at price P1 via a push rod 377 extending down from the left end of arm 225 of the lever 215 through a guide 379 on casting 39, this rod being bent to have a shoulder 381 engageable with finger 363 on the arm 359 for swinging arm 359 downward. Lever 217 controls the positioning of drag arm 369 in accordance with the change requirements on deposit of coin and purchase of an item selling at price P2 via a similar push rod 383 extending down from the left end of arm 245 of the lever 217 through the guide 379, this rod being bent to have a shoulder 385 engageable with finger 373 on arm 369 for swinging arm 369 downward.

When lever 215 swings to its exact price position, the rod 377 moves down a distance such as to push arm 359 to its no-change position. When lever 215 swings to its 5¢ over exact price position, the rod 377 moves down a distance such as to push arm 359 to its 5¢ change position. When lever 215 swings to its 10¢ over exact price position, the rod 377 moves down a distance such as to push arm 359 to its 10¢ change position. When lever 215 swings to its 15¢ over exact price position, the rod 377 moves down a distance such as to push arm 359 to its 15¢ change position. When lever 215 swings to its 20¢ over exact price position, the rod 377 moves down a distance such as to push arm 359 to its 5¢ change position.

Similarly, when lever 217 swings to its exact price position, the rod 383 moves down a distance such as to push arm 369 to its no-change position. When lever 217 swings to its 5¢ over exact price position, the rod 383 moves down a distance such as to push arm 365 to its 5¢ change position. When lever 217 swings to its 10¢ over exact price position, rod 383 moves down a distance such as to push arm 369 to its 10¢ change position. When lever 217 swings to its 15¢ over exact price position, rod 383 moves down a distance such as to push arm 369 to its 15¢ change position. When lever 217 swings to its 20¢ over exact price position, rod 383 moves down a distance such as to push arm 369 to its 20¢ change position.

A price selector lever 387 is pivoted at 389 on the back of arm 325 of the escapement lever 323. This selector lever has an upper arm 391 which extends to the left between levers 349 and 351 and which has a downwardly extending hook 393 at its left end adapted for engagement behind a rearwardly extending finger 395 on the lever 349, and a lower arm 397 having a rearwardly offset portion 399 extending to the left in the rear of lever 351 and which has an upwardly extending hook 401 at its left end adapted for engagement behind a rearwardly extending finger 403 on lever 351. The selector lever 387 is swingable on its pivot between a first price position wherein its hook 393 is located behind finger 395 on lever 349 (and wherein hook 401 is clear of finger 403 on lever 351) and a second price position wherein its hook 401 is located behind finger 403 on lever 351 (and wherein hook 393 is clear of finger 395 on lever 349). It is biased by a spring 405 connected to escapement lever 323 to swing upward (clockwise, on pivot 389 tending to swing it to its second price position. A pin 407 extends rearward from the left end of arm 397 of the selector. A lever 409 pivoted at 411 on the front of casting 37 engages this pin and normally holds the price selector lever in its first price position wherein the upper hook 393 is behind finger 395 on lever 351 and the lower hook 401 is clear of finger 403 on lever 451 (see FIG. 13). Lever 409 has a pin 413 at its left end extending through a slot 415 in the wall 39 of casting 37. This pin extends into a slot 417 in a lever 419 pivoted at 421 on the back of wall 39 of casting 37. This lever 419 is biased to swing clockwise by a spring 422. It has an upwardly extending arm 423 engageable by a finger 425 on a generally triangular lever 427 pivoted at 429 on the front of the main plate 1, this lever 427 being biased to swing clockwise by a spring 431. Lever 427 carries a roller 433 extending through an arcuate slot 435 in the main plate 1. The arrangement is such that lever 427, under the bias of its spring 431, normally holds lever 419 in its retracted position of FIG. 13 against the bias of its spring 422, thereby holding lever 409 in its first price position shown in FIG. 13 in which it holds price selector lever 387 in its FIG. 13 position wherein its upper hook 393 is positioned behind finger 395 on lever 349, and its lower hook 401 is clear of finger 403 on lever 351. On counterclockwise swing of lever 427 away from its FIG. 5A position, lever 419 is released for clockwise swing under the bias of spring 422 to its FIG. 14 position, moving lever 409 and hence price selector lever 387 to the second price position shown in FIG. 14 wherein lower hook 401 is positioned behind finger 403 and upper hook 393 is clear of finger 395.

Any suitable mode of controlling lever 427 may be used, details thereof not being critical. For example, the coin apparatus of this invention may be used in a manual vendor having manual pull-out knobs, certain of which are vending of articles of a first price, and others of which are for vending of articles of a second price, and having a linkage actuated on pulling out a knob or vending of an article of the second price, which remains inactive on pulling out a knob for an article of the first price. Reference may be made, for example, to Holstein et al. U.S. Patent 2,993,581, issued July 25, 1961, showing such pull-out knobs and price shaft mechanism associated therewith. In conjunction with the coin apparatus of this invention, the set-up would be such that lever 419 remains inactive on pulling out a knob for vending of an article of the first price, but is swung to its second price position (shown in FIG. 14), on pulling out a knob for vending an article of the second price.

Thus, on pulling out a knob for vending an article of the first price, price selector lever 387 remains in its FIG. 13 first price position, which means that, on counterclockwise swing of escapement lever 323, lever 349 is carried along with lever 323 via interengagement of upper hook 393 with finger 395. However, on pulling out a knob for vending an article of the second price, price selector lever 387 moves to its FIG. 14 second price position. This means that, on counterclockwise swing of escapement lever 323, lever 351 (instead of lever 349) is carried along with lever 323 via interengagement of lower hook 401 with finger 403. Suitable guide means may be provided for pin 407 to retain the selector lever 387 in its correct position as it moves with lever 323.

Means is provided for holding deposited coins in escrow until a purchase is made, and for returning the deposited coins to a customer if he desires return of his deposited coins without making a purchase. This means includes an escrow hopper 437 (see FIGS. 1, 6) in which certain nickels and any dime, quarter or half dollar is held until the customer either makes a purchase or pushes the usual coin return knob of the vendor to obtain return of his deposited coins. If he makes a purchase, the escrowed coins are delivered to a money box (not shown) through a vertical chute 439 on the inside of the right side flange 5 of the main plate 1. If he pushes the coin return knob of the vendor, the escrowed coins are delivered to the usual coin return cup of the vendor via a coin return chute 441. Separate provision is made for escrow of nickels via a nickel escrow gate 443 having a lug 444 adapted to hold nickels in the nickel chute NC of coin chute assembly. On a purchase operation, this gate opens, and the escrowed nickels are delivered through a nickel delivery chute 445 to a nickel change tube 447, assuming this tube and the chute are not full. If the tube 447 and chute 445 are full, the nickels pass through the hopper 437 and chute 439 to the money box. On a coin return operation, the nickels pass through the hopper 437 and chute 441 to the coin return cup.

The hopper 437 has an upper entrance passage 449, a money box passage 451 inclined downward and toward the right (as viewed from the front) from the entrance passage to the upper end of the money box chute 439, and a coin return passage 453 inclined downward and toward the left from the entrance passage to the upper end of the coin return chute 441. A gate 455 is provided for closing the upper end of the money box passage 451, and a gate 457 is provided for closing the upper end of the coin return passage 453. These gates are pivoted for swinging movement on a horizontal pin 459 extending from the front to the rear of the hopper. The gate 455 normally occupies a closed position inclined upward toward the right across the upper end of the money box passage 451 closing the latter, and the gate 457 normally occupies a closed position inclined upward toward the left across the upper end of the coin return passage 453 closing the latter. Each dime and quarter deposited in the vendor, after passing through the coin chute assembly 9 and actuating the recorder R, drops through the entrance passage 449 of the hopper into the V-shaped trough formed by the closed gates 455 and 457, thereby being held in escrow. Gate 455 is adapted to be released to swing down clockwise to allow escrowed coins to drop down through the money box passage 451 to the money box coin chute 439. Gate 457 is adapted to be released to swing down counterclockwise to allow escrowed coins to drop down through the coin return passage 453 to the coin return chute 441.

In order to reduce the size (particularly the front-to-back dimension) of the hopper 447, provision is made for escrowing a half dollar on edge isolated from coins held in escrow by gates 455 and 457. For this purpose, the plate 17 in which the half-dollar chute HC is formed has a downward extension 17a provided with a downward extension HC4 of the half-dollar chute. The back wall 447a of the hopper 447 is recessed to provide a half-dollar money box passage 451a (in back of passage 451) and a half-dollar return passage 453a (in back of passage 453) which diverge, in downward direction, from an upper half-dollar entrance passage 458. The passages 458, 451a and 453a are of narrow width, slightly larger than the thickness of a half dollar, for handling a half dollar on edge. Main plate 1 forms a back for these passages.

Figure 21:
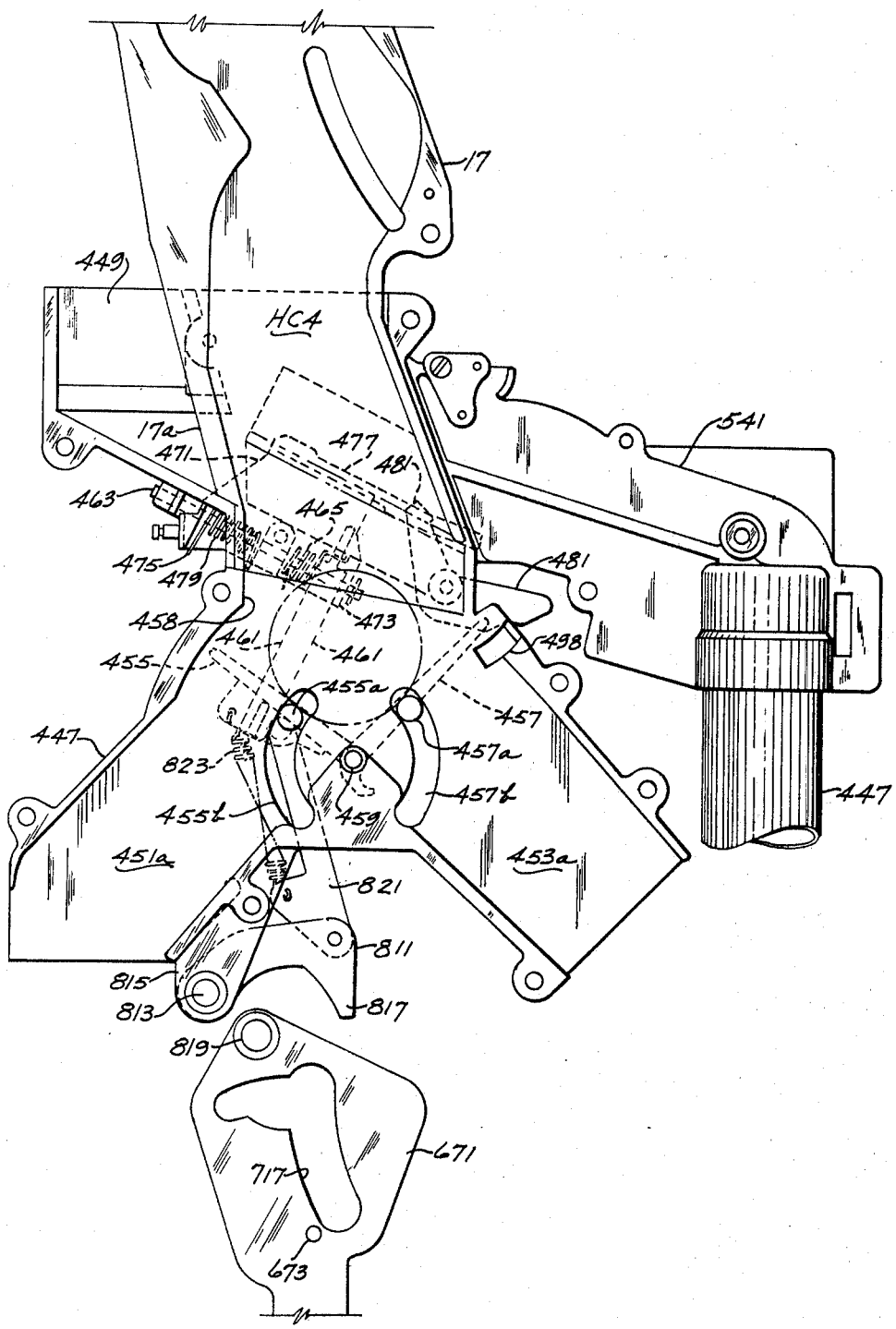
FIG. 21 is a view of the back of the escrow hopper, showing how a half dollar is escrowed on edge.

A pin 455a extends rearward from gate 455 through an arcuate slot 455b in wall 447a and the main plate 1, and a pin 457a extends rearward from gate 457 through an arcuate slot 457b in wall 447a and the main plate 1. These pins constitute means for supporting a half dollar in escrow on edge in the upper half-dollar entrance 458 when the gates and 457 are closed as shown in FIG. 21. When gate 455 swings down, carrying pin 455a down, the escrowed half dollar is released to drop down through passage 451a to the money box coin chute 439. When gate 457 swings down, carrying pin 457a down, the escrowed half dollar is released to drop down through passage 453a to the coin return chute 441.

Figures 19, 20:
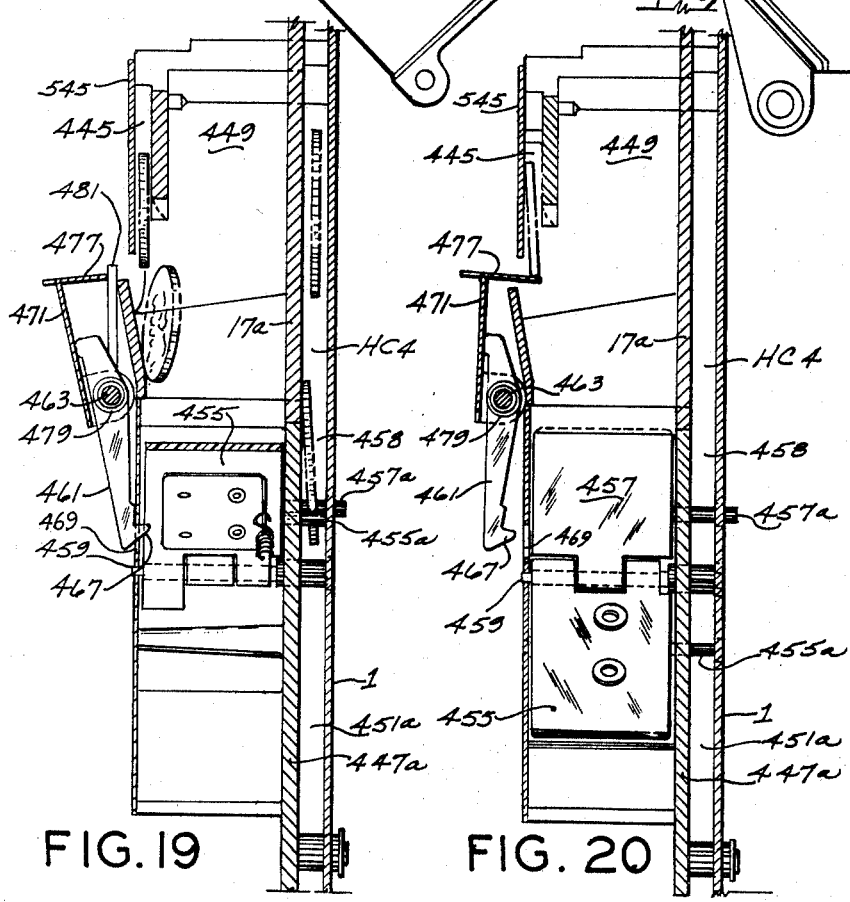
FIG. 19 is a section showing certain escrow and associated components.
FIG. 20 is a view similar to FIG. 19 showing a moved position of certain parts.

The money box hopper gate 455 is normally latched in its closed position by a latch 461 pivoted on and extending down from a pin 463 mounted in an inclined position on the front of the hopper at the bottom of the upper section of the hopper. A spring 465 biases the latch toward its latching position with respect to gate 455, the latch having a foot 467 at its lower end which reaches rearward through an opening 469 in the front wall of the hopper 437 for holding the gate up. A combination latch release and gate member 471 has left- and right-hand ears 473 and 475 pivoted on the pin 463 and includes a gate 477 adapted for movement between a closed position bottoming the right-hand portion of the nickel delivery chute 445 and an open position withdrawn from the nickel delivery chute. Member 471 is biased by a spring 479 to swing inward to close the gate, and is adapted to be held out in its open position by a latch 481 pivoted at 483 on the outside of the upper section of the hopper and biased toward latching position by a spring 485. The arrangement is such that, when the member 471 is latched in its open position by the latch 481, the latch 461 is released to assume its latching position under the bias of spring for latching the hopper gate 455 in closed position. When latch 481 is released (i.e., swung clockwise on its pivot 463 away from its latching position of FIG. 6), member 471 swings inward to its closed position wherein gate 477 is in its closed position bottoming the nickel delivery chute 445 (as shown in FIG. 20) and latch 461 is released to release the hopper gate 455 which immediately swings down to its open position. If gate 477 is closed, nickels released by nickel escrow gate 443 from nickel chute NC drop down onto gate 477 (see FIG. 20) and roll through the nickel delivery chute 445 to the nickel tube 447. If gate 477 is open (FIG. 19), nickels released by nickel escrow gate 443 from nickel chute NC drop down into the lower hopper section, and with gate open 455, are delivered through coin return passage 451 of the hopper to the money box chute 439.

The coin return gate 457 is normally latched up in its closed position by a latch arm 487 (see FIG. 2) pivoted at 488 on the back of the main plate 1, having a notch at its free end in which pin 457a on gate 457 is engageable. Arm 487 is biased to swing upward by a spring 489 for holding the gate 457 closed via interengagement with pin 457a. Arm 487 carries a stud 490 engageable by a shoulder 491 on the coin return bar 131 when the latter is moved downward for swinging arm 487 downward to allow gate 457 to swing downward to its open position.

The reset lever 133 for resetting the escapement wheel 45, the pawl 331, the nickel escrow gate 443 and the latch 481 are all actuated by an operating arm 493 pivoted at 495 on the back of the main plate 1 (see FIG. 2). This arm normally occupies the raised retracted position in which it appears in FIG. 2, under the bias of a spring 497. It is swung downward by suitable mechanism (not shown) of the vendor in which the coin apparatus of this invention is used whenever a customer makes a purchase. For example, when the coin apparatus is used in a manual vendor of the pull-out knob type, arm 493 is swung down whenever a knob is pulled out by suitable conventional mechanism for this purpose. The retracted position of arm 493 is determined by its engagement with a stud 494 on an arm 496 freely pivoted at 497 on the back of plate 1. Arm 496 has a finger 496a at its free end extending forward through an opening 498 in the plate 1 and the back wall 447a of hopper 447. The arrangement is such that when operating arm 493 swings down, arm 496 swings down to bring finger 496a under the coin return gate 457. This prevents opening of gate 457 if coin return bar 131 should then be pushed down. In other words, it prevents attempted return of coins during a purchase by operation of the coin return bar.

The operating arm 493 carries a stud 501 extending forward therefrom through an arcuate slot 503 in the main plate 1. Stud 501 carries a roller 504 riding in a slot 505 at the lower end of a lever 507 pivoted at 135 on the front of plate 1 overlying reset lever 133. Lever 507 actuates the reset lever via interengagement of a shoulder 511 on lever 507 with lever 133. The upper end 512 of lever 507 is engageable with a stud 513 on tail 337 of pawl 331 to release this pawl. Reset lever 133 carries a stud 515 extending forward therefrom engageable with a lever 517 pivoted at 519 on the hopper, this lever 517 (which consists of a bent length of wire) having an arm 521 engageable with a stud 523 on a tail 525 of the nickel escrow gate 443. Lever 507 has a stud 527 extending forward therefrom engageable with latch 481.

The arrangement is such that when operating arm 493 is swung downward on a purchase, lever 507 is rocked counterclockwise from its FIG. 16 position. Lever 507 rocks reset lever 133 counterclockwise against the return bias of spring 139 to reset the escapement wheel 45 of the recorder R. The upper end 512 of lever 507 engages stud 513 on the tail 337 of pawl 331 to release this pawl. The stud 515 on the reset lever 133 rocks the bent wire lever 517 clockwise to swing the nickel escrow gate 443 open. Stud 527 on lever 507 rocks latch 481 counterclockwise to release the gate member 471, which thereupon swings to its FIG. 20 closed position bottoming the right-hand portion of the nickel delivery chute 445, also releasing the latch 461 for the money box hopper gate 455. The latter thereupon swings down for delivery of escrowed coins to the money box chute 439. On upward return of operating arm 493, the lever 507 and reset lever 133 return to their FIG. 16 position. This allows return of pawl 331 and the nickel escrow gate 443. Gate member 471 remains closed, latch 481 hanging up under gate portion 477 of the gate member. The money box hopper gate 455 remains open. Member 471 and gate 455 are ultimately restored to their open and closed positions, respectively, in a manner to be described.

The arrangement is also such that when coin return bar 131 is pushed down, its cam edge 155 engages roller 141 on reset lever 133 to swing the latter counterclockwise independently of lever 507 (which remains stationary) thereby resetting the recorder R, releasing the pawl 331, and swinging the nickel escrow gate 443 open. The gate 477 stays open; the money box hopper gate 455 stays closed. Latch arm 487 for the coin return gate 457 is swung down by the coin return bar 131 to allow gate 457 to open. Accordingly, all escrowed coins including nickels initially escrowed by nickel escrow gate 443, are returned. The latter nickels simply fall into the hopper and out into the coin return chute 441 via passage 453.

The nickel tube 447 extends upward adjacent the left side of the unit on the inside of the left side flange 3 of main plate 1 from a coin ejector base 529 mounted on plate 1. The base has a right-hand section 531 and a stepped-down left-hand section 533. The latter projects out to the left of the main plate through the gap 7 in the left side flange 3 of the main plate. The raised right-hand section of the base is formed with a socket 537 extending upward therefrom receiving the lower end of the nickel tube 447. The upper end of the nickel tube is received in a semicircular recess 539 in a nickel delivery chute extension 541 of the upper section of the hopper 437. This extension is formed with a groove 543 constituting the nickel delivery chute and is provided with a cover plate 545 for the groove. A removable clamp 547 holds the upper end of the nickel tube in the recess 539.

The socket 537 has an annular shoulder 549, the lower end of the nickel tube bearing on this shoulder. The socket 537 and the nickel tube are adapted to support a stack of nickels to be issued in change normally supported on a nickel ejector slide 551. This slide is retractable toward the right to allow the stack to drop down onto a shelf 553 secured to the bottom of section 531 of the base 529 and is then movable forward (toward the left) so that the forward (left) end of the slide pushes the lowermost nickel of the stack along the shelf to an opening 555 in the shelf, the nickel then dropping out through this opening and into a coin return chute section 557. Section 531 of base 529 is formed with a channel 559 for guiding the slide for reciprocating movement away from the back to a retracted position wherein the forward end portion of the slide is under the socket. A spring 561 biases the slide toward the left to its retracted position.

A dime tube 563 extends upward from the stepped-down left end section 533 of the base 529, a plate 565 formed with a socket 567 for the lower end of the dime tube being provided on section 533. The upper end of the dime tube is received in a funnel 569 at the upper end of a holder 571 attached to the outside of the left side flange 3 of the main plate 1, the funnel providing for easy manual loading of the dime tube with dimes. The socket 567 has an annular shoulder 573, the lower end of the dime tube bearing on this shoulder. The socket and the dime tube are adapted to support a stack of dimes to be issued in change normally supported on a dime ejector slide 575. This slide is retractable rearward (toward the right) to allow the stack to drop down onto a shelf 577 secured to the bottom of section 533 of the base and is then movable forward (toward the left) so that the forward (left) end of the slide pushes the lowermost dime of the stack along the shelf 577 and off the left end of the shelf, the dime falling into coin return chute section 557. Section 533 is formed with a channel 579 for guiding the slide 575 for reciprocating movement away from and back to a retracted position wherein the forward end portion of the slide is under the socket. The slide has a widened rearward extension 581 formed with an opening 583, and is biased forward toward its retracted position by springs such as indicated at 585.

The nickel ejector slide 551 is adapted to be pulled rearward (i.e. toward the right) away from its forward position by an arm 587, referred to as the nickel slide pick-up arm, of a bell crank 589 pivoted at 591 at the upper end of a lever 593 which is in turn pivoted at 595 at its lower end on a casting 597 secured to the main plate 1. The dime ejector slide is adapted to be pulled rearward (i.e., toward the right) away from its retracted position by a dime slide pick-up arm 599 pivoted at 591 at the upper end of lever 593 along with the nickel pick-up arm. Lever 593 is biased by a spring 601 for engagement of a cam follower roller 603 on the back of the lever with a cam 605 on the output shaft 607 of an electric motor-speed reducer drive unit generally designated 609, the motor of which is indicated at 611 and the gear box of which is indicated at 613, the latter fitting in a rectangular opening 615 in the main plate 1. Rotation of shaft is clockwise as viewed from the front. The cam 605 is developed and phased to cause lever to swing toward the right away from its retracted position of FIG. 27 and then back toward the left to its retracted position upon rotation of the shaft and cam through a single-revolution cycle from the home position of the cam shown in FIG. 27.

The nickel pick-up arm 587 extends toward the left from pivot 591 and has an upwardly extending finger 617 at its left end adapted for engagement in an opening 619 at the right end of the nickel ejector slide 551 to actuate this slide. The bell crank 589 has a downwardly extending arm 621 having a pin 623 extending rearward at its lower end into an opening 625 in lever 593, and is biased counterclockwise by a spring 627 to a retracted position determined by engagement of pin 623 with the right side of opening 625 wherein finger 617 is below and disengaged from the opening 619 in the nickel ejector slide 551. The dime pick-up arm 599 extends toward the left from pivot 591 and has an upwardly extending finger 629 at its left end adapted for engagement in opening 583 in the dime ejector slide 575. The dime pick-up arm 599 is biased to swing upward by a torsion spring 633 toward a position wherein its pick-up finger 629 is engaged in opening 583 in the dime ejector slide 575, but is normally held in a retracted position wherein pick-up finger 629 is below and clear of the dime ejector slide by its engagement with a finger 635 extending down from the left end of a lever 637 through the opening 583 in the dime ejector slide. This lever is pivoted at 638 on base 529.

The nickel pick-up arm 587 is adapted to be lifted for interengagement of its finger 617 with the nickel ejector slide 551 by a lever 639 pivoted at 641 on a die cast base 643 mounted on the front of the main plate 1. This lever has an arm 645 extending upward from the pivot 641 and an arm 647 extending toward the left underneath a pin 649 projecting forward from the nickel pick-up arm adjacent its free end. Lever 639 is biased to swing clockwise as viewed in FIG. 7 by a spring 651 for engagement of a roller 653 on the rear of lever arm 645 adjacent its upper end with a change control ratchet member 655. This control member 655 is pivoted at 657 on the base casting 643 for swinging movement about a horizontal axis upward in steps from the lowered retracted position in which it appears in FIG. 7, and back downward to retracted position. It is generally of sector shape, extending to the right from pivot 657, and has a series of five ratchet teeth a, b, c, d and e on its arcuate free edge (its right-hand edge). On its front face, adjacent its arcuate edge, it has a rib 659 having an upper section 659a curved on an arc centered in the axis of pivot, a section 659b curving toward the right and downward, a section 659c inclined downward toward the left, a section 659d curved on the same arc as section 659a, and a lower section 659e curving toward the right and downward. Sections 659b and 659c define an upper recess 661; section 659e defines a lower recess 663.

A link 665 interconnects arm 327 of escapement lever 323 and the control member 665, having a pin connection at 667 at the free end of arm 327 and a pin connection at 669 with the control member. The arrangement is such that when lever 323 escapes to its no-change position, link 665 pulls up the control member 655 one step to a no-change position. When lever 323 escapes to its 5¢ change position, link 665 pulls up the control member two steps to a 5¢ change position. When lever 323 escapes to its 10¢ change position, link 665 pulls up the control member three steps to a 10¢ change position. When lever escapes to its 15¢ change position, link 665 pulls up the control member four steps to a 15¢ change position. When lever escapes to its 20¢ change position, link 665 pulls up the control member five steps to a 20¢ change position.

Arm 645 of lever 639 extends in front of the control member 655, and roller 653 on the rear of arm 645 engages the left side of the rib 659 on the control member under the bias of spring 651. When the control member is in its fully lowered retracted position, roller 653 engages the upper section 659a of the rib 659, holding lever 639 in a retracted position in respect to the nickel pick-up arm 587, meaning that the nickel pick-up arm is in retracted position disengaged from the nickel ejector slide 551. When the control member 655 is pulled up one step to its no-change position, roller 653 remains on the upper section 659a of the rib 659, and the nickel pick-up arm remains in retracted position. When the control member is pulled up two steps to its 5¢ change position, roller 653 drops into recess 661, with accompanying clockwise swing of lever 639 so that its arm 647 lifts the nickel pick-up arm 587 into position for engagement of finger 617 in the opening 619 in the nickel ejector slide. When the control member is pulled up three steps to its 10¢ change position, roller 653 contacts the upper end of section 659d of the rib, so that lever 639 and the nickel pick-up arm 587 occupy their retracted position. When the control member is pulled up four steps to its 15¢ change position, roller 653 contacts the lower end of section 659d of the rib, so that lever 639 and the nickel pick-up arm 587 initially occupy their retracted position. When the control member is pulled up five steps to its 20¢ change position, roller 653 drops into recess 663 with accompanying clockwise swing of lever 639 so that its arm 647 lifts the nickel pick-up arm 587 into position for engagement of finger 617 in opening 619 in the nickel ejector slide 551.

Figure 7:
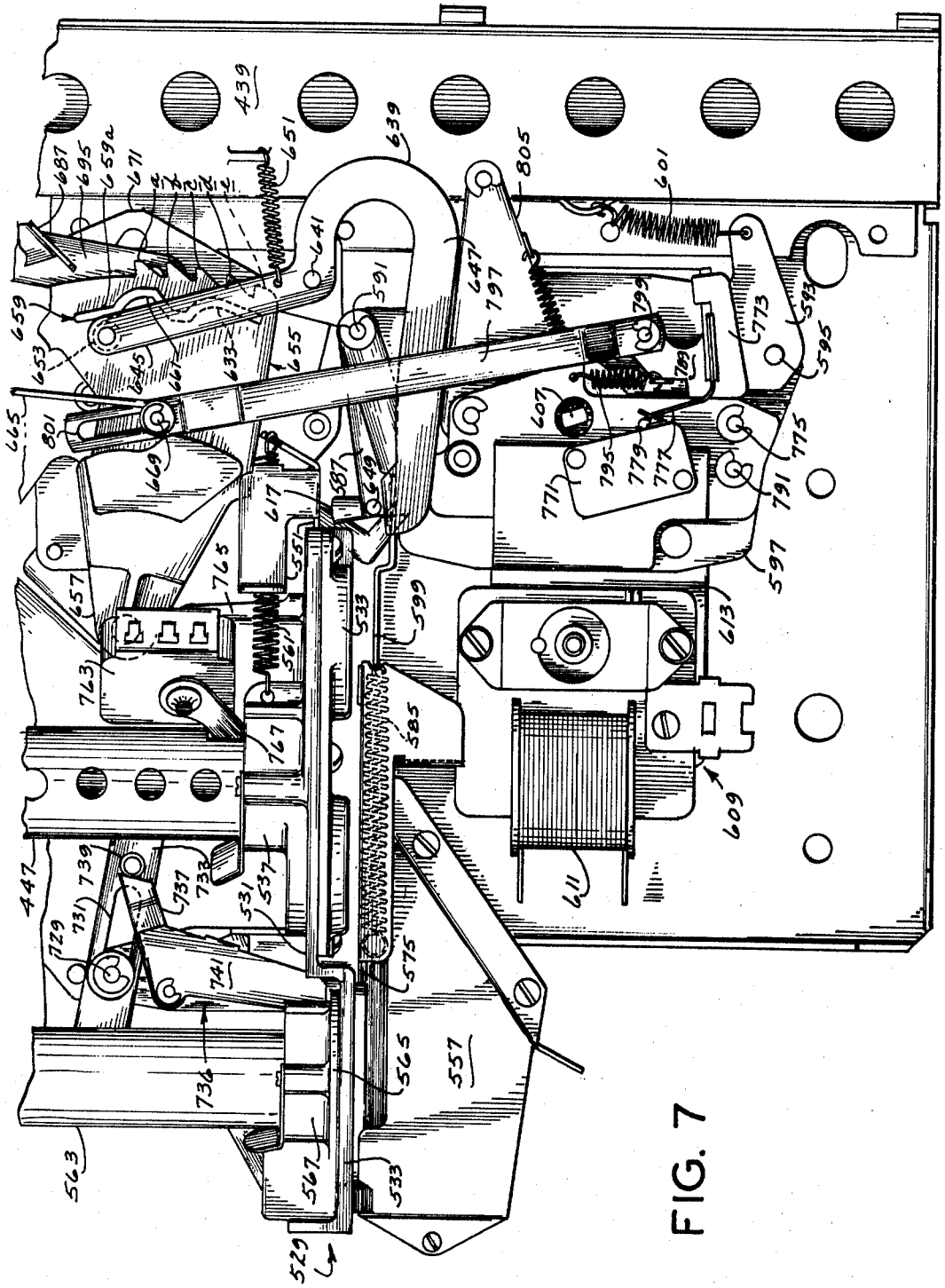
FIG. 7 is an enlarged view of the lower part of FIG. 1 showing a change-dispensing mechanism of the apparatus.

An indexing drive mechanism is provided for returning the control member 655 (i.e., driving it downward) from any advanced (raised) position thereof back to its retracted position of FIG. 7. This drive mechanism comprises a lever 671 pivoted at 673 on the casting 643 and having a forked lower end 675 receiving a roller 677 on the back of lever 593. The arrangement is such that when lever 593 is swung clockwise away from its retracted position by cam 605, lever 671 is swung counterclockwise away from its retracted position of FIG. 28, and, when lever 593 swings counterclockwise back to its retracted position, lever 671 swings clockwise back to its retracted position. Lever 671 carries a roller 679 received in a slot 681 in a pawl drive arm 683 pivoted at 685 on casting 643, the arrangement being such that when lever 671 swings counterclockwise away from its retracted position, drive arm 683 is swung down clockwise from its retracted position of FIG. 28. A pawl 687 pivoted at 689 on the drive arm 683 is engageable with the ratchet teeth on control member 655 for ratcheting it downward. The pawl extends down from its pivot and has an arm 691 extending toward the left carrying a roller 693 adjacent its free end. A cam follower lever 695 is pivoted at 689 underneath the pawl. This lever extends down from pivot 689 and has an arm 701 extending toward the left from the pivot. A cam follower roller 703 at the lower end of lever 695 is engageable with a plate cam 705 pivoted at 707 on casting 643. Arm 701 has a forwardly extending ear 709 engageable by the lower edge of pawl arm 691. A spring 711 interconnected between pawl arm 691 and lever 695 biases these to swing toward one another, i.e., biases arm 691 to swing relative to lever 695 toward engagement of arm 691 with ear 709 on arm 701 of lever 695. A spring 713 biases lever 695 to swing clockwise on pivot 689 for engagement of roller 703 with the edge of the plate cam 705. A follower 715 extends rearward from the plate cam 705 into an opening 717 in lever 671. The plate cam 705 is formed with an opening 719 accommodating the roller 679, and is biased by a spring 721 to swing clockwise as viewed in FIG. 28.

The base 529 for the change tubes has a post 727 extending upward therefrom. This post carries a stud 729 extending through an elongate slot 731 in a shift bar 733 for the plate cam 705, the bar having a pin connection with this cam at 735. Spring 721 acting through the cam biases the shift bar 733 to move toward the left to a retracted position determined by engagement of the right end of slot 731 with the stud 729. However, the shift bar 733 is adapted to be latched in the advanced position shown in FIG. 22 (wherein the left end of slot 731 is adjacent stud 729) by a latch mechanism generally designated 736 as long as there are dimes above a predetermined level in the dime tube socket 567, this latch mechanism releasing the shift bar when the supply of dimes is depleted below this level for movement of the shift bar to its stated retracted position with accompanying swinging of cam 705 to a lowered retracted position. As shown in FIGS. 22 and 28, this latch mechanism comprises a latch 737 pivoted at 739 on post 727 having a nose engageable with a roller 739 on the shift bar. A dime feeler arm 741 is pivoted at 739 along with the latch 737. The lower end portion of the dime feeler arm reaches through a vertical slot 747 in the dime tube 563 and the dime tube socket 567. When there are seven or more dimes, for example, in the dime tube, the lower end of the feeler arm 741 is held out in the retracted position in which it appears in FIG. 22 and holds up the nose of latch 737 in latching position behind roller 739 on the shift bar. When the supply of dimes is depleated below the seven-dime level, the feeler arm 741 is released to swing into the socket 567. A spring 749 interconnects the latch and feeler arm, the latter having an ear 750 engageable with the latch. The arrangement is such that, on depletion of the supply of dimes below the seven-dime level, and on a slight shift of the bar 733 to the right, which occurs during each vend cycle as will appear, the feeler arm 741 swings into the dime tube and latch 737 swings down to a retracted position wherein its nose is below and clear of roller 739, whereupon the bar springs out to the left and cam 705 swings to a lowered retracted position, which may be referred to at its "out-of-dimes" position.

As long as the shift bar 733 is latched in its advanced position of FIG. 22, which may be referred to as its "dimes-in-stock" position, cam 705 is correspondingly held in its raised or "dimes-in-stock" position of FIG. 22. When the cam 705 is in this position, roller 703 at the lower end of lever 695 engages a lower formation 705a of the cam. Under these conditions, a dime is ejected in change from the dime tube when 10¢ in change is called for, a dime and nickel are ejected in change when 15¢ in change is called for, and a dime and two nickels are ejected in change when 20¢ in change is called for. However, if the supply of dimes is depleted below the seven-dime level, with accompanying downswing of the cam to its out-of-dimes position, the roller 703 at the lower end of lever 695 engages an upper formation 105b on the cam. Also, the cam 705 releases a so-called set-up toggle 751 for the nickel pick-up arm 587. This toggle is pivoted at 638 on the base 529 along with lever 637, and has a follower roller 753 engageable with the cam 705, being biased to swing counterclockwise by a spring 754 for engagement of roller 753 with the cam. This spring 754 is interconnected between the toggle and lever 637. The toggle 751 has a hook 755 which reaches underneath a rearward extension of pin 649 on the nickel pick-up arm 587. Roller 753 on the toggle normally engages the lower edge of control member 655 when the latter is down. When the cam swings to its out-of-dimes position, and control member 655 swings up to or beyond its 10¢ change position, the toggle is released and swings counterclockwise so that its hook 755 lifts the nickel pick-up arm 587 into position for engagement of finger 617 in opening 619 in the nickel ejector slide 551. Under these conditions, two nickels (rather than a dime) are ejected in change when 10¢ in change is called for, three nickels (rather then a dime and a nickel) are ejected in change when 15¢ in change is called for, and four nickels (rather than a dime and two nickels) are ejected in change when 20¢ in change is called for.

The lever 637 which controls the dime pick-up arm 599 is controlled from the control member 655, this lever having a follower roller 757 (see FIG. 26) at its upper end riding in a cam groove 759 in the back face of the control member 655. This groove has a relatively narrow upper section and a relatively wide lower section. The arrangement is such that when control member 655 swings upward to its 10¢, 15¢ or 20¢ change position, and as long as there are dimes in stock, lever 637 is swung clockwise on its pivot to allow the dime pick-up arm 599 to swing upward for engagement of its finger 629 with the dime ejector slide 575. However, whenever the stock of dimes is depleted below the seven-dime level, and bar 733 moves to its out-of-dimes position, lever 637 is held down to maintain the dime pick-up arm 599 inactive by engagement of a roller 759 on the bar with a tail 761 on lever 637.

A nickel tube empty switch 763 is mounted on a second post 765 extending up from the change tube base 529. This switch has a feeler arm 767 the lower end portion of which reaches into the nickel tube and nickel tube socket through a slot 769 therein. A control switch 771 for motor 611 is mounted on the casting 613. A lever 773 pivoted at 775 on the casting 613 carries an operating arm 777 engageable with the button 779 of the control switch. This lever also carries a cam follower roller 781 engageable with a switch control cam 783 on shaft 607, this cam having a notch 785. Lever 773 is biased to swing clockwise for engagement of the roller 781 with the cam. In the home position of the cam, the roller 781 is in the notch and the switch button is released. The switch is actuated to start a cycle of operation in response to upward movement of control member 655 via mechanism comprising an arm 789 pivoted at 791 on casting 613 extending under and engageable with an ear 793 on lever 773. A spring 795 biases the arm 789 to swing upward. A link 797 is pin-connected at 799 to the arm 789, and extends upward in front of the control member 655, having an elongate slot 801 at its upper end receiving the pin 669 on the control member. The arrangement is such that when the control member 655 is down in its retracted position, pin 669 engages the lower end of slot 801, holding the link 797 down to hold the arm 789 down in the retracted position in which it appears in FIG. 28, backed down from the ear 793 on lever 773 so that the latter occupies its switch-release position under the bias of sring mechanism in switch 771. When the control member 655 swings upward, arm 789 is released to swing upward under the bias of spring 795 to swing lever 773 counterclockwise thereby to actuate the switch 771. On ultimate return of the control member 655 to its lowered retracted position, link 797 pushes arm 789 back down and this allows roller 781 to drop into notch 785 in cam 783 with accompanying clockwise swing of lever 773 to release the switch, terminating the cycle.

The gate member 471, at the start of any vend cycle, occupies its open position, being held in this position by latch 481. On a purchase, latch 481 is released and the gate member closes. It must then be reset (i.e., opened and latched open) for the next vend cycle. This is taken care of by providing a reset cam 803 in shaft 607 actuating a follower lever 805 pivoted at 806 on casting 613 connected by a link 807 to the gate member. Lever 805 carries a follower roller 809 for engagement with the cam 803, and is biased by a spring 810 for engagement of the roller with the cam. The arrangement is such that, on a revolution of cam 803, lever 805 is swung counterclockwise to push up the link 807, which acts to swing gate member 471 open, and latch 481 then snaps in to latch the gate member in its open position.

Mechanism for controlling the money box hopper gate 455 is shown best in FIG. 21 to comprise a cam follower lever 811 pivoted at 813 on a flange 815 of the hopper having a hook 817 at its free end for engagement by a cam follower roller 819 on lever 671. A link 821 interconnects lever 811 and gate 455, and a spring 823 is interconnected between the gate and this link. The arrangement is such that, when the hopper gate 455 swings open, the hook 817 is brought into a position for engagement by roller 819 on lever 671 when the latter is subsequently swung counterclockwise as viewed in FIG. 28 by cam 605 acting through lever 593 to swing lever 811 upward, thereby returning the gate 455 to its plosed position, wherein it is latched by the latch 461.

Figure 32:
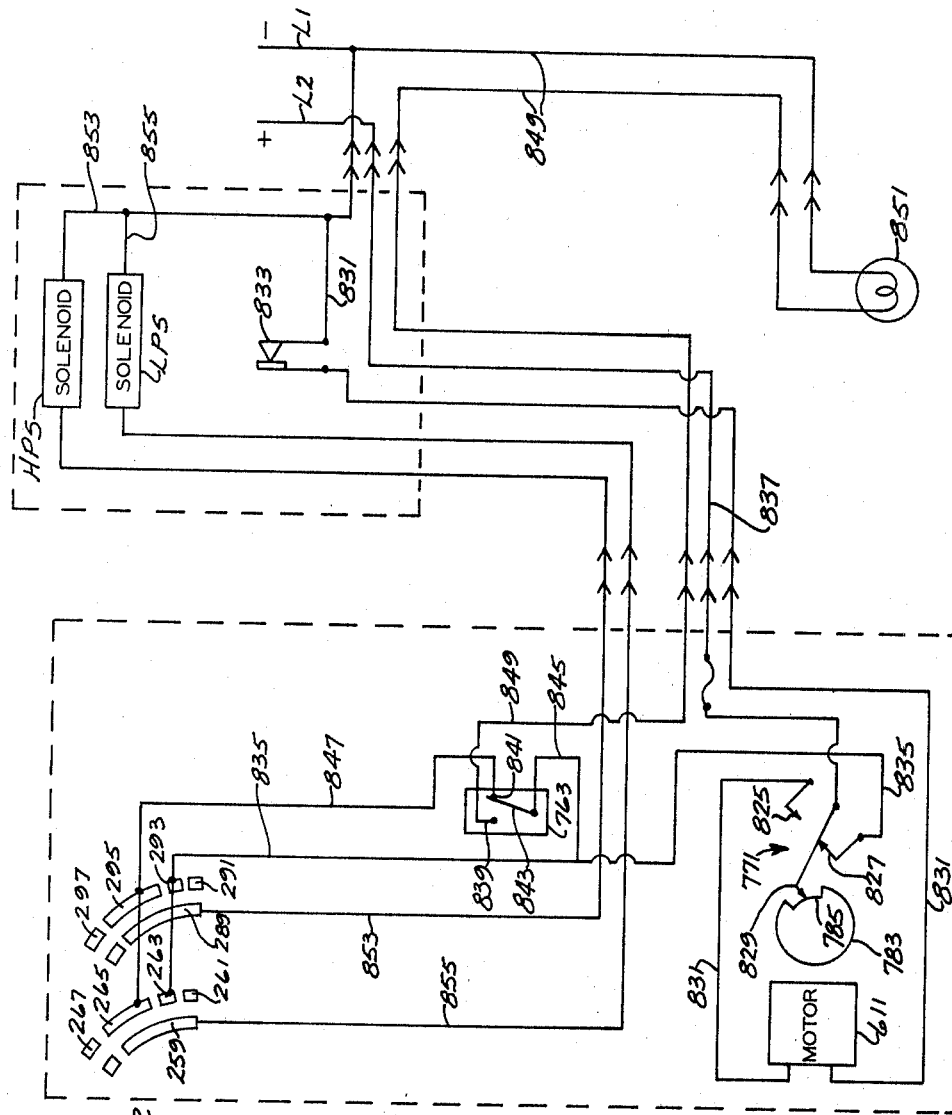
FIG. 32 is a wiring diagram.
Figure 29:
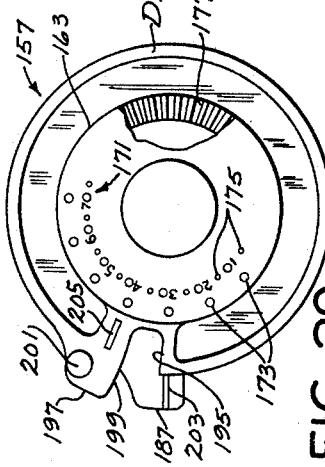
FIG. 29 is a rear elevation of a price disk or credit register assembly.
Figure 30:
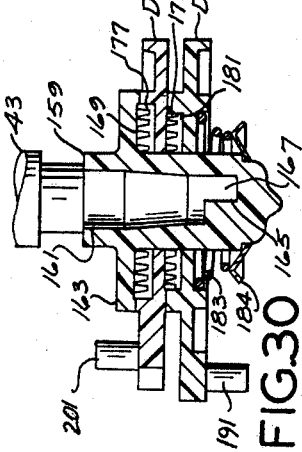
FIG. 30 is a longitudinal section of the FIG. 29 assembly.
Figure 31:
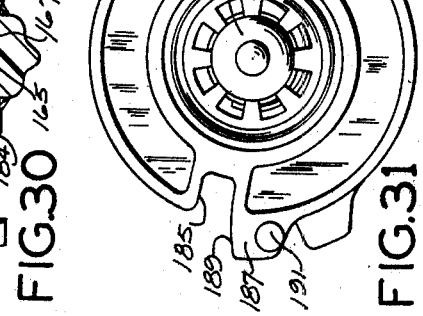
FIG. 31 is a front elevation of the FIG. 29 assembly.

Referring to FIG. 32, the switch 771 is shown to be a double-throw switch having upper and lower terminals 825 and 827 and a movable contactor 829 which is normally closed on the lower terminal when the switch button 779 is released (i.e., when roller 781 is in the notch 785 of cam 783). The motor 611 is connected in series as indicated at 831 with a switch 833 between one side L1 of a power source and the upper terminal 825. This switch 833 is a normally closed switch, which opens on instigation of a vend cycle. For example, when the unit of this invention is used in a manual vendor having pullout knobs as above described, switch 833 is opened on pulling out any knob. The lower terminal 827 is connected as indicated at 835 with the exact price contacts 263 and 293 of the printed circuit board 257, and the movable contactor 829 is connected as indicated at 837 to the other side L2 of the power source. The nickel tube empty switch 763 is a double-throw switch having left and right terminals 839 and 841 and a movable contactor 843 normally closed (with nickels in stock) on the right terminal 841. The movable contactor 843 is interconnected as indicated at 845 via 835 with the lower terminal 827 of switch 771, and the right terminal is interconnected as indicated at 847 with the elongate arcuate change contacts 265 and 295 of the circuit board. The left terminal 839 is connected as indicated at 849 in series with a lamp 851 for signalling that the apparatus is out of nickels, and that the exact price needs to be deposited. The unit of this invention is especially designed for use in a manual vendor of the pull-out knob type having two locks for locking the pull knobs out of operation, one lock being a so-called high price lock and the other a so-called low price lock. A solenoid HPS is provided for retracting the high price lock and a solenoid LPS is provided for retracting the low price lock. Solenoid HPS is connected in a line 853 between contact 289 of the circuit board and line L1, and solenoid LPS is connected in a line 855 between contact 259 of the circuit board and line L1. The locks and solenoids are mounted on the right side wall of the vendor, and the arrangement is generally such that the low price lock normally occupies its locking position and the high price lock normally occupies a retracted position, suitable mechanism being provided in the vendor for effecting movement of the high price lock to its locking position and movement of the low price lock to its retracted position on pulling out a knob for vending of an item selling at the high price.

Operation is as follows:

On deposit of a nickel in the vending machine in which the apparatus of this invention is used, the nickel first travels through the coin selector and slug rejector (not shown), which passes it to the nickel chute NC of the coin chute assembly 9. The nickel falling in the upper passage NC1 of the nickel chute, strikes the finger 87 on trip wire 83, and swings this wire down. This results in a one-step escape of escapement wheel 45, as previously explained, with resultant clockwise rotation of shaft 43 and the price disks D1 and D2 through one 5¢ step from their zero position. The nickel passes on by the finger 83, and is arrested to be held in escrow at the lower end of nickel chute section NC2 by the lug 444 on the upper nickel escrow gate 443. On deposit of a second nickel, the escapement wheel 45 escapes another step, and the price disks are rotated through another 5¢ step to record the deposit of 10¢. The second nickel is arrested in nickel chute passage NC2 on top of the first nickel (see FIG. 9). Each of any nickels subsequently deposited effects further one-step escapes of wheel 45 and the price disks, and is diverted into nickel chute passage NC3, falling out of the lower end of this chute section into the escrow hopper 437, where it is held in escrow by the hopper gates 455 and 457.

On deposit of a dime, the dime first travels through the coin selector and slug rejector, which passes it into the dime chute DC. The dime, falling in the upper passage DC1 of the dime chute, strikes the finger 87 on trip wire 83 and swings this wire down. This results in a one-step (5¢) escape of wheel 45 and a one-step (5¢) advance of the price disks. The dime passes on by the finger 87, and then strikes finger 89 on trip wire 85 to swing the latter down. This results in another one-step escape of wheel 45 and a one-step advance of the price disks to register deposit of 10¢. The dime passes on by finger 89, and falls out of the dime chute into the escrow hopper 437 where it is held by the hopper gates 455 and 457. Each dime subsequently deposited similarly effects a two-step (10¢) advance of the price disks and passes to the escrow hopper.

On deposit of a quarter, the quarter first passes through the coin selector and slug rejector, which passes it to the quarter chute QC. The quarter, falling in the upper passage QC1 of the quarter chute, strikes the finger 103 on trip wire 99 and swings this wire down. This results in a five-step (25¢) escape of wheel 45 and a five-step (25¢) advance of the price disks D1 and D2. The quarter passes on by the finger 105 and falls out of the quarter chute into the escrow hopper 437 where it is held by the hopper gates 455 and 457. A subsequently deposited quarter similarly effects a five-step (25¢) advance of the price disks, and passes to the escrow hopper.

On deposit of a half dollar, the half dollar passes through the coin selector and slug rejector, which passes it to the half dollar chute HC. The half dollar, falling in the upper passage HC1 of the half dollar chute, strikes finger 103 on trip wire 99 and swings this wire down. This results in a five-step (25¢) escape of wheel and a five-step (25¢) advance of the price disks. The half dollar passes on by finger 103, and then strikes finger 105 on trip wire 101 to swing the latter down. This results in another five-step (25¢) escape of wheel 45 and a five-step (25¢) advance of the price disks to register the deposit of 50¢. The half dollar passes on by finger 105, and falls out of the half-dollar chute into the escrow hopper, where it is held in escrow on edge on pins 455a and 457a (see FIG. 21).

It will be understood that coins may be deposited in any order, and the total amount of credit will be totalized and registered by the price disks D1 and D2. For example, on deposit of a nickel and a dime, the price disks will advance three steps from their zero position to register a credit of 15¢, on deposit of a quarter and two nickles or a dime, they will advance seven steps to register a credit of 35¢, etc.

Considering that the price disk D1 is set for handling vending of items selling at price P1 and price disk D2 is set for handling vending of items selling at price P2, with P2 higher than price P1, in the zero position of the disks, notch 185 in disk D1 is P1/5 steps back of follower 223 on lever 215, and notch 195 in disk D2 is P2/5 steps back of follower 243 on lever 217. For example, if disk D1 is set for 30¢ items, notch 185 would be six steps back of follower 223, and if disk D2 is set for 40¢ items, notch 195 would be eight steps back of follower 243.

Assuming a purchaser deposits an amount P1 for purchase of an item selling at the lower price P1 (i.e., he deposits the exact price), the disks D1 and D2 are advanced P1/5 steps. The follower 223 on lever 215 drops into the notch 185 in disk D1 with accompanying counterclockwise swing of lever 215 to its exact prive position wherein contact finger 227a of the wiper arm 227 engages the exact price contact 263. This completes a circuit for the low price solenoid LPS which may be traced from line L1 through solenoid LPS, via line 855, contact 259, wiper arm 227, contact 263, line 835, switch terminal 827, contactor 829 and line 837 to line L2. The solenoid LPS is thus energized to take out the associated low price lock, thus enabling purchase of a price P1 item. Also, on counterclockwise swing of lever 215 to its exact price position, push rod 377 is driven down to the point where it swings the drag arm 359 down one step to its no-change position wherein finger 363 on this drag arm is opposite shoulder 345 on stop block 341.

When the purchaser pulls out a knob for obtaining a price P1 item, the price selector lever 387 remains in its first price position (FIG. 13) wherein its upper hook 393 is engageable with finger 395 on lever 349 (and its lower hook 401 is clear of finger 403 on lever 351). On pull-out of the knob, operating arm 493 (see FIG. 2) is swung downward, and this swings lever 133 counterclockwise away from its FIG. 16 retracted position. On return of the knob, the operating 493 returns upward to its retracted position and lever 133 returns to its retracted position. This actuation of lever 133 on actuation of the knob effects the following operations:

A. Resetting of the escapement wheel 45 and the price disks D1 and D2 to the zero position, via engagement of reset roller 137 on the reset lever 133 with lever 53 of recorder R.

B. Release of the pawl 331 from the first tooth $a$ of ratchet 331 at the lower end of arm 325 of escapement lever 323 via engagement of the upper end 512 of lever 507 with stud 513 on tail 337 of the pawl. Escapement lever 323 thereupon escapes (i.e., swings counterclockwise) to its no-change position (determined by engagement of finger 363 on drag arm 359 with shoulder 345).

C. Release of the latch 481 for the gate member 471, via engagement of stud 527 on lever 507 with the latch. Gate member 471 thereupon closes, and latch 461 is retracted to release the money box hopper gate 455 to permit it to swing open. Any coins escrowed in hopper 437 thereupon are delivered to the money box chute 439.

D. Opening of the upper nickel escrow gate 443, via engagement of stud 515 on lever 133 with the bent wire lever 517. Any nickels escrowed by the gate 443 drop down onto the gate 477 of the gate member 471 (now closed) and roll down the latter and through the nickel delivery chute 445 to the nickel tube 447 to replenish the supply of nickels therein.

On release of the pawl 331 (operation B), the escapement lever 323 swings counterclockwise under the bias of spring 339 to its no-change position as determined by hook 393 on the price selector lever 387 (which is carried by the escapement lever) engaging behind finger 395 on lever 349, swinging lever 349 clockwise, and lever 349 dragging the drag arm 359 to the right to the points where finger 363 on the drag arm 359 engages shoulder 345 on the stop block 341. In this no-change position of the escapement lever 323, the bottom of the second tooth $b$ of ratchet 331 is positioned above the tip of the pawl 331.

On counterclockwise swing of the escapement lever 323 to its no-change position, link 665 is pulled up by arm 327 of the escapement lever to pull up the control member 655 one step to its no-change position wherein roller 653 on lever 639 is in engagement with the lower end of the upper section 659a of rib 659 on the control member. When the control member 655 swings upward, link 797 follows it upward with accompanying counterclockwise swing of arm 789 to actuate lever 773 to throw contactor 829 of motor switch 771 onto terminal 825. On pull-out of the knob by the purchaser, switch 833 opens, and, on return of the knob (completing the vend), switch 833 closes. This completes a circuit for motor 611 which may be traced from line L1 via line 831 (switch 833 being closed after return of the pull knob), terminal 825, contactor 829 and line 837 to line L2. The motor 611 thereby starts up to rotate cam shaft 607 and cams 605, 783 and 803 clockwise from their home positions as viewed in FIGS. 27 and 28.

On rotation of the cam shaft 607 through a revolution, cam 605 thereon causes lever 593 to swing clockwise toward the right away from its retracted position of FIGS. 27 and 28 and then back toward the left to its retracted position. As lever 593 swings toward the right, it drags both the nickel pick-up arm 587 and the dime pick-up arm 599 toward the right. However, since roller 653 on lever 639 is in engagement with upper section 659a of rib 659 on control member 655, the nickel pick-up arm 587 remains in its lowered retracted position so that it simply idles without actuating the nickel ejector slide 551. Also, since the lever 637 which controls the dime pick-up arm 599 remains in its lowered retracted position of FIG. 22 on upward movement of the control member, the dime pick-up arm 599 remains in its lowered retracted position and simply idles without actuating the dime ejector slide 575. Thus, no change is issued (none being called for).

Lever 593, in swinging right and then left, acts via lever 671 to swing the pawl drive arm 683 downward from its retracted position and then back upward to its retracted position. As drive arm 683 swings downward, pawl 687 carried by the drive arm, moving down and toward the left with the drive arm, comes into engagement with the right edge of the control member 655 and then into engagement with the first tooth $a$ of the control member, and drives the control member back downward one step to reset it in its lowered retracted position. As the control member 655 swings downward, it acts through link 665 to swing the escapement lever 323 clockwise, resetting the latter in its home position wherein it is latched by engagement of pawl 331 with the first tooth $a$ of the ratchet 329 on lever 323. This also latches the control member 655 in its retracted position.

Also on rotation of cam shaft 607 through a revolution, cam 803 thereon causes lever 805 to swing upward, thereby pushing link 807 upward to reset the gate member 471 in its open position, and to cause it to become latched in its open position by the latch 481. This also causes hopper door latch 461 to be reset to its latching position. Follower roller 819 on lever 671 (see FIG. 21) acts via lever 811 to swing the money box hopper gate 455 back upward to its closed position, and this gate is latched in its closed position by the latch 461.

The return of the control member 655 to its lowered retracted position is completed before the camshaft 607 completes a revolution, and hence switch operating arm 789 is backed down from lever 773 by link 797 before the camshaft completes a revolution. On the completion of a revolution, therefore, roller 781 on lever 773 is enabled to drop into notch 785 in cam 783 thereby to actuate switch 771 to stop the motor at the conclusion of the above-described single-revolution cycle, with camshaft 607 back in its home position.

If a purchaser deposits an amount P1+5¢ for purchase of an item selling at price P1 (e.g., P1 may be 30¢, and the purchaser may deposit a quarter and a dime), the prime disks D1 and D2 are advanced P1/5+1 steps. Under these circumstances, lever 215 is swung to its 5¢ over exact price position (i.e., a 5¢ change position) wherein contact finger 227a of the wiper arm 227 is on contact 265. This completes the circuit for solenoid LPS which, (assuming there are nickels in stock in tube 447) may be traced from line L1 through solenoid LPS via line 855, contact 259, wiper arm 227, contact 265, line 847, switch 763 (closed on contact 841), lines 845 and 835, terminal 827, contactor 829 and line 837 to line L2. The solenoid LPS is thus energized to take out the associated lock, permitting the purchaser to pull out a knob for obtaining a price P1 item. Also on counterclockwise swing of lever 215 to its 5¢ over exact price position, push rod 377 is driven down to the point where it swings the drag arm 259 down two steps to its 5¢ change position wherein finger 363 on this drag arm is opposite the 5¢ change groove GA1 in the stop block 341.

Now, pull-out and return of a knob for obtaining a price P1 item results in the same operations A, B, C and D as above described. However, on release of the pawl 331 (operation B), escapement lever 323 swings counterclockwise under the bias of spring 339 to its 5¢ change position, as determined by finger 363 on drag arm 359 being stopped at the right end of the 5¢ change groove GA1 in the stop block 341. In this 5¢ change position of the escapement lever 323, the bottom of the third tooth c of ratchet 331 is positioned above the tip of the pawl 331.

On counterclockwise swing of the escapement lever 323 to its 5¢ change position, link 665 pulls up the control member 655 two steps to its 5¢ change position wherein the roller 653 on lever 639 drops into the upper recess 661 of the rib 659 on the control member, with accompanying swing of lever 639 to lift the nickel pick-up arm 587 for entry of finger 617 on arm 587 in the opening 619 in the nickel ejector slide 551. Switch 771 is actuated in the same manner as previously described to start the motor 611 to drive the camshaft 607. The camshaft 607 rotates through a revolution, during which lever 593 moves the raised nickel pick-up arm 587 to the right and then back to the left. Since the nickel pick-up arm is raised, it drags the nickel ejector slide 551 to the right and then returns it to the left so as to eject a nickel from the nickel tube 447 for delivery to the purchaser via delivery chute section 557. The lever 637 remains in its lowered retracted position of FIG. 22 so that the dime pick-up arm 599 simply idles without actuating the dime ejector slide 575. Thus, only a nickel is issued in change.

On the stated revolution of the camshaft 607, lever 593 is driven through a stroke and pawl drive arm 683 is driven thereby through a stroke via lever 671. On this stroke of the pawl drive arm, pawl 687 comes generally directly into engagement with the first tooth a of control member 655 and drives it downward two steps back to its home position. This results in lever 639 swinging back to its retracted position, allowing the nickel pick-up arm 587 to back down to its retracted position. The control member 655 acts through link 665 to swing escapement lever 323 clockwise to reset it in its home position wherein it is latched by engagement of pawl 331 with the first tooth a of ratchet 329. This also latches control member 655 in its home position, and, at the conclusion of a single-revolution cycle, switch 711 is released to deenergize the motor 611 with camshaft 607 back to its home position.

If a purchaser deposits an amount P1+10¢ for purchase of an item selling at price P1, the price disks D1 and D2 are advanced P1/5+2 steps. Under these circumstances, lever 215 is swung to its 10¢ over exact price position (i.e., a 10¢ change position) wherein contact finger 227a of wiper arm 227 is on contact 265. This completes the circuit for solenoid LPS in the same manner as above described on deposit of P1+5¢, and solenoid LPS is energized to take out the associated lock, permitting the purchaser to pull out a knob for obtaining a price P1 item. Also, on counterclockwise swing of lever 215 to its 10¢ over exact price position, push rod 377 is driven down to the point where it swings drag arm 259 down three steps to its 10¢ change position wherein finger 363 on the drag arm is opposite the 10¢ change groove GA2 in the stop block 341.

Now, pull-out and return of a knob for obtaining a price P1 item results in the same operations A, B, C and D as above described. However, on release of the pawl 331 (operation B), escapement lever 323 swings counterclockwise under the bias of spring 339 to its 10¢ change position as determined by finger 363 on drag arm 359 being stopped at the right end of the 10¢ groove GA2 in the stop block 341. In this 10¢ change position of the escapement lever 323, the tip of its fourth tooth d is positioned above the tip of the pawl 331.

On counterclockwise swing of the escapement lever 323 to its 10¢ change position, link 665 pulls up the control member 655 three steps to its 10¢ change position wherein the roller 653 on lever 639 engages the upper part of section 659d of rib 659 on the control member so that lever 639 occupies its retracted position. Assuming that the dime tube 563 contains a sufficient supply of dimes that bar 733 is latched in its dimes-in-stock position of FIGS. 22 and 28 by latch 737, thereby holding cam 705 in its retracted position, the nickel pick-up arm 587 occupies its lowered retracted position as shown in FIG. 22. However, due to the upward swing of the control member 655 to its 10¢ change position, lever 637 (controlled by member 655) will have swung clockwise through an angle such as to release the dime pickup arm 599 so that the latter occupies its raised position with its finger 629 hooked into opening 583 in the dime ejector slide 575. Also, on the upward swing of the control member 655, link 797 follows it upward and switch 711 is actuated to start the motor 611 to rotate the camshaft 607.

The camshaft 607 then rotates through a first revolution, during which lever 593 moves the raised dime pick-up arm 599 to the right and then returns it to the left, thereby to move the dime ejector slide 575 to the right and then back to the left to eject a dime from the dime tube 567 for delivery to the purchaser via delivery chute section 557. The nickel pick-up arm 587 remains in its lowered retracted position of FIG. 22 and simply idles without actuating the nickel ejector slide 551. Thus, only a dime is issued in change.

On the stated first revolution of the camshaft, 607 and resultant actuation of levers 593 and 671 and pawl drive arm 683 through a first stroke, pawl 687 comes into engagement with the second tooth b of the control member 655 and drives the latter back downward two steps. This results in lever 637 swinging back clockwise to its position for holding the dime pick-up arm 599 down. The control member 655 acts through link 665 to swing escapement lever 323 clockwise two steps to an intermediate position wherein the tip of pawl 331 is between the first and second teeth a and b of the ratchet 329. Since the control member 655 is still one step above its home position, switch 711 remains closed on terminal 825 to keep motor 611 energized for a second revolution of the camshaft 607. On this second revolution of the camshaft, levers 593 and 671 and pawl drive arm 683 are driven through a second stroke, during which pawl 687 comes into engagement with the first tooth a of control member 655 and drives it downward one step back to its home position. Link 665 thereupon returns escapement lever 323 a final step back to its home position, wherein it is latched by pawl 331. At the conclusion of the second camshaft cycle, roller 781 drops into notch 785 in cam 783, deactuating switch 711 for deenergizing motor 611 with the camshaft back in home position.

If a purchaser deposits an amount P1+15¢ for purchase of an item selling at price P1, the price disks D1 and D2 are advanced P1/5+3 steps. Under these circumstances, lever 215 is swung to its 15¢ over exact price position (i.e., a 15¢ change position) wherein contact finger 227a of wiper arm 227 is on contact 265. This completes the circuit for solenoid LPS in the same manner as above described on deposit of P1+5¢ or P1+10¢, and solenoid LPS is energized to take out the associated lock, permitting the purchaser to pull out a knob for obtaining a price P1 item. Also, on counterclockwise swing of lever 215 to its 15¢ over exact price position, push rod 377 is driven down to the point where it swings drag arm 259 down four steps to its 15¢ change position wherein finger 363 on the drag arm is opposite the 15¢ change groove GA3 in the stop block 341.

Now, pull-out and return of a knob for obtaining a price P1 item results in the same operations A, B, C and D as above described. However, on release of the pawl 331 (operation B), escapement lever 323 swings counterclockwise under the bias of spring 339 to its 15¢ change position, as determined by finger 363 on drag arm 359 being stopped at the right end of the 15¢ groove GA3 in the stop block 341. In this 15¢ change position of the escapement lever 323, the tip of its fifth tooth e is positioned above the tip of the pawl 331.

On counterclockwise swing of the escapement lever 323 to its 15¢ change position, link 665 pulls up the control member 655 four steps to its 15¢ change position wherein the roller 653 on lever 639 engages the lower part of section 659d of rib 659 on the control member so that lever 639 occupies its retracted position. Assuming that the dime tube 563 contains a sufficient supply of dimes that bar 733 is latched in its dimes-in-stock position of FIGS. 22 and 28 by latch 737, thereby holding cam 705 in its retracted position, the nickel pick-up arm 587 occupies its lowered retracted position as shown in FIG. 22. However, due to the upward swing of the control member 655 to its 15¢ change position, lever 637 (controlled by member 655) will have swung clockwise through an angle such as to release the dime pick-up arm 599 so that the latter occupies its raised position with its finger 629 hooked into opening 583 in the dime ejector slide 575. Also, on the upward swing of the control member 655, link 797 follows it upward and switch 711 is actuated to start the motor 611 to rotate the camshaft 607.

The camshaft 607 then rotates through a first revolution, during which lever 593 moves the raised dime pickup arm 599 to the right and then returns it to the left, thereby to move the dime ejector slide 575 to the right and then back to the left, to eject a dime from the dime tube 567 for delivery to the purchaser via delivery chute section 557. The nickel pick-up arm 587 remains in its lowered retracted position of FIG. 22 and simply idles without actuating the nickel ejector slide 551. Thus, a dime is issued in change on this first cycle of revolution of the camshaft.

On the stated first revolution of the camshaft, 607, and resultant actuation of levers 593 and 671 and pawl drive arm 683 through a first stroke, pawl 687 comes into engagement with the third tooth c of the control member 655 and drives the latter back downward two steps. This results in lever 637 swinging back clockwise to its position for holding the dime pick-up arm 599 down. It also results in roller 653 dropping into recess 661 in rib 659 on control member 655, with resultant swing of lever 639 to raise the nickel pick-up arm 587 for entry of finger 617 in opening 619 in the nickel ejector slide 551. The control member 655 acts through link 665 to swing escapement lever 323 clockwise to an intermediate position wherein the tip of pawl 331 is between the second and third teeth b and c of the ratchet 329. Since the control member 655 is still two steps above its home position, switch 711 remains closed on terminal 825 to keep motor 611 energized for a second revolution of the camshaft 607. On this second revolution of the camshaft, levers 593 and 671 and pawl drive arm 683 are driven through a second stroke. During this second stroke, the nickel pick-up arm 587 (now raised) actuates the nickel ejector slide 551 to eject a nickel from the nickel tube 447, thereby completing delivery of 15¢ in change. Also pawl 687 comes into engagement with the first tooth a of control member 655 and drives it downward two steps back to its home position. Link 665 thereupon returns escapement lever 323 back to its home position, wherein it is latched by pawl 331. At the conclusion of the second camshaft cycle, roller 781 drops into notch 785 in cam 783, deactuating switch 711 for deenergizing motor 611 with the camshaft back in home position.

If a purchaser deposits an amount P1+20¢ for purchase of an item selling at price P1, the price disks D1 and D2 are advanced P1/5+4 steps. Under these circumstances, lever 215 is swung to its 20¢ over exact price position (i.e., a 20¢ change position) wherein contact finger 227a of wiper arm 227 is on contact 265. This completes the circuit for solenoid LPS in the same manner as above described on deposit of P1+5¢, P1+10¢ or P1+15¢, and solenoid LPS is energized to take out the associated lock, permitting the purchaser to pull out a knob for obtaining a price P1 item. Also, on counterclockwise swing of lever 215 to its 20¢ over exact price position, push rod 377 is driven down to the point where it swings five steps to its 20¢ change position wherein finger 363 on the drag arm is below stop block 341.

Now, pull-out and return of a knob for obtaining a price P1 item results in the same operations A, B, C and D as above described. However, on release of the pawl 331 (operation B), escapement lever 323 swings counterclockwise under the bias of spring 339 to its 20¢ change position, as determined by its engagement with stop 367. In this 20¢ change position of the escapement lever 323, the tip of its fifth tooth e is positioned above the top of the pawl 331.

On counterclockwise swing of the escapement lever 323 to its 20¢ change position, link 665 pulls up the control member 655 to its 20¢ change position wherein the roller 653 on lever 639 enters recess 663 in rib 659 on the control member, with accompanying swing of lever 639 to lift the nickel pick-up arm 587. Assuming that the dime tube 563 contains a sufficient supply of dimes that bar 733 is latched in its dimes-in-stock position of FIGS. 22 and 28 by latch 737, thereby holding cam 705 in its retracted position, due to the upward swing of the control member 655 to its 20¢ change position, lever 637 (controlled by member 655) will have swung clockwise through an angle such as to release the dime pick-up arm 599 so that the latter occupies its raised position with its finger 629 hooked into opening 583 in the dime ejector slide 575. Also, on the upward swing of the control member 655, link 797 follows it upward and switch 711 is actuated to start the motor 611 to rotate the camshaft 607. Additionally, on the upward swing of the control member 655, an upward extension 655a thereof engages roller 693 on pawl arm 691 to change ensuing action of the pawl 687.

The camshaft 607 then rotates through a first revolution, during which lever 593 moves both the raised nickel pick-up arm 587 and the raised dime pickup arm 599 to the right and then returns them to the left, thereby to move both the nickel ejector slide 551 and the dime ejector slide 575 to the right and then back to the left to eject both a nickel from the nickel tube 447 and a dime from the dime tube 567 (a total of 15¢) for delivery to the purchaser via delivery chute section 557.

On the stated first revolution of the camshaft, 607, and resultant actuation of levers 593 and 671 and pawl drive arm 683 through a first stroke, pawl 687 comes into engagement with the third tooth c of the control member 655 and drives the latter back downward three steps. This results in lever 637 swinging back clockwise to its position for holding the dime pick-up arm 599 down. The control member 655 acts through link 665 to swing escapement lever 323 clockwise to an intermediate position wherein the tip of pawl 331 is between the second and the third teeth b and c of the ratchet 329. Since the control member 655 is still two steps above its home position, switch 711 remains closed on terminal 825 to keep motor 611 energized for a second revolution of the camshaft 607. On this second revolution of the camshaft, levers 593 and 671 and pawl drive arm 683 are driven through a second stroke.

During this second stroke, the nickel pickup arm 587 (still raised) actuates the nickel ejector slide 551 to eject a second nickel from tube 447, thereby completing delivery of 20¢ in change. Also pawl 687 comes into engagement with the first tooth a of control member 655 and drives it downward two steps back to its home position. Link 665 thereupon returns escapement lever 323 back to its home position, wherein it is latched by pawl 331. At the conclusion of the second camshaft cycle, roller 781 drops into notch 785 in cam 783, deactuating switch 711 for deenergizing motor 611 with the camshaft back in home position.

Each time the lever 671 is swung counterclockwise by lever 593, the cam 705 is swung counterclockwise a small amount by the action of the edge portion of lever 571 bounding opening 717 in lever 671 on follower 715 carried by the cam 705. The result of this is that shift bar 733 is dragged slightly to the right to clear roller 739 from the nose of the latch 737. Accordingly, on any cycle during which the supply of dimes in dime tube 563 is reduced from seven to six, the feeler arm 741 swings into the dime tube, and latch 737 swings down to release the bar 733 for movement to the left to an out-of-dimes position determined by engagement of the right end of slot 731 in the bar with stud 729, cam 705 swinging clockwise to its out-of-dimes position. Roller 759 on the bar comes into position over the tail 761 on lever 637 and holds the latter down to keep the dime pick-up arm 599 down. With cam 705 in its out-of-dimes position, roller 703 at the lower end of lever 695 is engagable with cam formation 705b, and toggle 751 is cleared for release, setting up the unit for all-nickel payback instead of nickel and dime payback and also changing the operation on payback of one nickel, as follows:

One upward swing of control member 655 two steps to its 5¢ change position, the nickel pick-up arm 587 is lifted and motor 611 is set in operation as before. The camshaft 607 rotates through a first revolution during which a nickel is ejected and pawl 687 engages the second tooth b of control member 655, and drives it down only one step. The motor 611 is therefore held in operation for a second revolution of the camshaft, during which pawl 687 engages the first tooth a of the control member, and drives it down a second step to its home position.

On upward swing of control member 655 three steps to its 10¢ change position, even though lever 639 occupies its retracted position, the nickel pickup arm 587 is lifted by the hook 755 of toggle 751, which swings up on upward swing of control member 655 (being cleared to do so by reason of cam 705 being in its out-of-dimes position). Motor 611 is set in operation as before. Camshaft 607 rotates through a first revolution during which a first nickel is ejected and pawl 687 engages the third tooth c of the control member and drives it down one step. The motor continues in operation for a second revolution of the camshaft, during which a second nickel is ejected and pawl 687 engages the second tooth b of the control member and drives it down another step. The control member, via its engagement with roller 753 on toggle 751, pushes the toggle down to the point where it allows the nickel pick-up 587 to disengage from the nickel ejector slide 551. The motor continues in operation for a third revolution of the camshaft, during which pawl 687 engages the first tooth a of the control member and drives it down a third step back to its home position.

On upward swing of control member 655 four steps to its 15¢ change position, the nickel pick-up arm 587 is lifted by the hook 755 of toggle 751, and motor 611 is set in operation as before. Camshaft 607 rotates through a first revolution during which a first nickel is ejected and pawl 687 engages the fourth tooth d of the control member and drives it down one step. The motor continues in operation for a second revolution of the camshaft, during which a second nickel is ejected and pawl 687 engages the third tooth c of the control member and drives it down a second step. The motor continues in operation for a third revolution of the camshaft, during which a third nickel is ejected and pawl 687 engages the second tooth b of the control member and drives it down a third step. At this stage, toggle 751 has been lowered to the point where the nickel pick-up arm 587 is disengaged from the nickel ejector slide 551. The motor continues in operation for a fourth revolution of the camshaft, during which pawl 687 engages the first tooth a of the control member and drives it down a fourth step back to its home position.

On upward swing of control member 655 five steps to its 20¢ change position, the nickel pick-up arm 587 is lifted by toggle 751 and motor 611 is set in operation as before. Camshaft 607 rotates through a first revolution during which a first nickel is ejected and pawl 687 engages the fifth tooth e of the control member and drives it down one step. The motor continues in operation for a second revolution of the camshaft, during which a second nickel is ejected and pawl 687 engages the fourth tooth d of the control member and drives it down a second step. The motor continues in operation for a third revolution of the camshaft, during which a third nickel is ejected and pawl 687 engages the third tooth c of the control member and drives it down a third step. The motor continues in operation for a fourth revolution of the camshaft, during which a fourth nickel is ejected, and pawl 687 engages the second tooth b of the control member and drives it down a fourth step. At this stage, toggle 751 has been lowered to the point where the nickel pick-up arm 587 is disengaged from the nickel ejector slide 551. The motor continues in operation for a fifth revolution of the camshaft, during which pawl 687 engages the first tooth a of the control member and drives it down a fifth step back to its home position.

Assuming a purchaser deposits an amount P2 for purchase of an item selling at the higher price P2, the disk D2 is advanced P2/5 steps. The follower 243 on lever 217 drops into the notch 195 in disk D2, with accompanying counterclockwise swing of lever 217 to its exact price position wherein contact finger 247a of wiper arm 247 engages the exact price contact 293. This completes a circuit for the high price solenoid HPS which may be traced from line L1 through solenoid HPS via line 853, contact 289, wiper arm 247, contact 293, line 835, switch terminal 827, contactor 829 and line 837 to line L2. The solenoid HPS is thus energized to take out the associated high price lock, thus enabling purchase of a price P2 item. Also, on counterclockwise swing of lever 217 to its exact price position, push rod 383 is driven down to the point where it swings the drag arm 369 down one step to its no-change position wherein finger 373 on this drag arm is opposite shoulder 345 on stop block 341.

When a purchaser pulls out a knob for obtaining a price P2 item, lever 419 is swung to its FIG. 14 position, thereby swinging lever 409 counterclockwise from its FIG. 13 to its 14 position for release of the price selector lever 387 to swing to its FIG. 14 position wherein its lower hook 401 is engageable with finger 403 on lever 351 (and its upper hook 393 is clear of finger 395 on lever 349). On pull-out of the knob for purchase of the price P2 item, operations A, B, C and take place the same as on purchase of a price P1 item (as previously described). On release of the pawl 331 (operation B), the escapement lever 323 swings counterclockwise under the bias of spring 339 to its no-change position as determined by hook 401 on the price selector lever 387 engaging behind finger 403 on lever 351, swinging lever 351 clockwise, lever 351 dragging the drag arm 369 to the right to the point where finger 373 on drag arm 369 engages shoulder 345 on stop block 341. Operation then proceeds in the same manner as above described on counterclockwise swing of the escapement lever to its no-change position.

If a purchaser deposits an amount P2+5¢ for purchase of an item selling at price P2, price disk D2 is advanced P2/5+2 steps. Under these circumstances, lever 217 is swung to its 5¢ over exact price position (i.e., a 5¢ change position) wherein contact finger 247a of wiper arm 247 is on contact 295. This completes the circuit for solenoid HPS (assuming there are nickels in stock in tube 447) which may be traced from line L1 through solenoid HPS via line 853, contact 289, wiper arm 247, contact 295, line 847, switch 763 (closed on contact 841), lines 845 and 835, terminal 827, contactor 829 and line 837 to line L2. The solenoid HPS is thus energized to take out the associated lock, permitting the purchaser to pull out a knob for obtaining a price P2 item. Also, on counterclockwise swing of lever 217 to its 5¢ over exact price position, push rod 383 is driven down to the point where it swings the drag arm 369 down two steps to its 5¢ change position wherein finger 373 on arm 369 is opposite the 5¢ change groove GB1 in the back of stop block 341.

Now, pull-out and return of a knob for obtaining a price P2 item results in the same operations A, B, C and D as above described, and movement of price selector lines 387 to its FIG. 14 high price position. On release of pawl 331 (operation B), escapement lever 323 swings counterclockwise to its 5¢ change position as determined by finger 373 on drag arm 369 being stopped at the end of the 5¢ change groove GB1 in the back of block 341. Operation then proceds in the same manner as above described on counterclockwise swing of the escapement lever to its 5¢ change position.

If a purchaser deposits an amount P2+10¢ for purchase of an item selling at price P2, price disk D2 is advanced P2/5+1 steps. Under these circumstances, lever 217 is swung to its 10¢ over exact price position (i.e., a 10¢ change position) wherein contact finger 247a of wiper arm 247 is on contact 295. This completes a circuit for solenoid HPS in the same manner as above described on deposit of P2+5¢, and solenoid HPS is energized to enable the purchaser to pull out a knob for obtaining a price P2 item. Also, on counterclockwise swing of lever 217 to its 10¢ over exact price position, push rod 383 is driven down to the point where it swings the drag arm 369 down three steps to its 10¢ change position wherein finger 373 on arm 369 is opposite the 10¢ change groove GB2 in the back of block 341.

Now, pull-out and return of a knob for obtaining a price P2 item results in the same operations A, B, C and as above described, plus movement of price selector lever 387 to its FIG. 14 high price position. On release of pawl 331 (operation B), escapement lever 373 swings counterclockwise to its 10¢ change position as determined by finger 373 on drag arm 369 being stopped at the end of the 10¢ change groove GB2 in the back of block 341. Operation then proceeds in the same manner as above described on counterclockwise swing of the escapement lever to its 10¢ change position.

If a purchaser deposits an amount P2+15¢ for purchase of an item selling at price P2, price disk D2 is advanced P2/5+3 steps. Under these circumstances, lever 217 is swung to its 15¢ over exact price position (i.e., a 15¢ change position) wherein contact finger 247a of wiper arm 247 is on contact 295. This completes a circuit for solenoid HPS in the same manner as above described on deposit of P2+5¢, and solenoid HPS is energized to enable the purchaser to pull out a knob for obtaining a price P2 item. Also, on counterclockwise swing of lever 217 to its 15¢ over exact price position, push rod 383 is driven down to the point where it swings the drag arm 369 down four steps to its 15¢ change position wherein finger 373 on arm 369 is opposite the 15¢ change groove GB3 in the back of block 341.

Now, pull-out and return of a knob for obtaining a price P2 item results in the same operations A, B, C and D as above described, plus movement of price selector lever 387 to its FIG. 14 high price position. On release of pawl 331 (operation B), escapement lever 323 swings counterclockwise to its 15¢ change position as determined by finger 373 on drag arm 369 being stopped at the end of the 15¢ change groove GB3 in the back of block 341. Operation then proceeds in the same manner as above described on counterclockwise swing of the escapement lever to its 15¢ change position.

If a purchaser deposits an amount P2+20¢ for purchase of an item selling at price P2, price disk D2 is advanced P2/5+4 steps. Under these circumstances, lever 217 is swung to its 20¢ over exact price position (i.e., a 20¢ change position) wherein contact finger 247a of wiper arm 247 is on contact 295. This completes a circuit for solenoid HPS in the same manner as above described on deposit of P2+5¢, and solenoid HPS is energized to enable the purchaser to pull out a knob for obtaining a price P2 item. Also, on counterclockwise swing of lever 217 to its 20¢ over exact price position, push rod 383 is driven down to the point where it swings the drag arm 369 down five steps to its 10¢ change position wherein finger 373 on arm 369 is below block 341.

Now, pull-out and return of a knob for obtaining a price P2 item results in the same operations A, B, C and D as above described, plus movement of price selector lever 387 to its FIG. 14 high price position. On release of pawl 331 (operation B), escapement lever 323 swings counterclockwise to its 20¢ change position as determined by its engagement with stop 367. Operation then proceeds in the same manner as above described on counterclockwise swing of the escapement lever to its 20¢ change position.

From the above, it will appear that each of the price disks or credit registers D1 and D2 is movable away from a zero credit position in response to deposit of money in the vendor for registering the amount deposited. Each may move to an exact price position (corresponding to price P1 or P2) and beyond to one of a number of change positions calling for issue of different amounts in change (5¢, 10¢, 15¢ or 20¢). Each may also move beyond the 20¢ change position, but this simply brings finger 227a into engagement with contact 267 or finger 247a into engagement with contact 297. The levers 215, 217, and wipers 227 and 247, the circuit board 257 etc. constitute means controlled by the registers D1 and D2 for controlling the vendor to permit a vend on movement of D1 or D2 to or beyond the P1 or P2 position. The mechanism including escapement lever 323, link 665 and control member 655 constitutes means for controlling the coin issuing means of the apparatus, and the rods 377 and 387 and drag arms 359 and 369 constitute means operable in response to movement of registers D1 and D2 to any one of its change positions for presetting said control means for subsequent movement to its corresponding change position.

On pull-out of a knob for a vend, the credit registers D1 and D2 are reset to their zero credit position, and the stated control means moves to its pre-set change position (e.g., in the case of pre-set for 5¢ change by downward movement of drag arm 359 or 369 to its 5¢ change position, the control means, including member 655, moves to its 5¢ change position). On return of the knob, completing the vend, the coin issuing means (shown in FIGS. 7 and 22) is activated to issue the amount in change called for. Since the credit registers D1 and D2 have been reset to zero, money may be immediately deposited and the amount thereof registered for a subsequent vend while the coin issuing means is carrying out its function of issuing a coin or coins in change, the control means for the coin issuing means in effect holding the data required as to the amount of change to be issued after reset of the credit registers.

It will also be observed that as long as there are over a certain number of dimes in stock in the preloaded dime tube 563, a dime is issued in change when 10¢ is called for, a dime and a nickel are issued in change when 15¢ is called for, and a dime and two nickels are issued in change when 20¢ is called for. However, when the supply of dimes is depleted, two nickels are issued from the vendor-fed nickel tube 447 when 10¢ is called for, three nickels when 15¢ is called for, and four nickels when 20¢ is called for. Particularly with nickel tube 447 being a vendor-fed tube, this considerably prolongs the ability of the apparatus to vend with change, without use of unduly tall nickel and dime tubes.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control and change maker for a vendor comprising:
   a credit register movable away from a zero credit position in response to deposit of money in the vendor for registering the amount deposited and resettable to said zero position, said credit register being movable to an exact price position corresponding to the price of an item to be vended and beyond said exact price position to any one of a number of change positions calling for issue of different amounts in change,
   means controlled by said credit register for controlling the vendor to permit a vend on movement of the credit register to or beyond said exact price position,
   means for issuing a coin in change in different amounts,
   means controlled by said credit register and operable in response to a vend of an item selling at said price for initiating operation of said coin issuing means to issue coin in change in accordance with the amount of change called for by the credit register, and
   means operable in response to a vend for resetting the credit register to zero position substantially simultaneously with the vend and before completion of operation of the coin issuing means, whereby money may be deposited in the vendor and the amount thereof registering for a subsequent vend during the operation of the coin issuing means.

2. A control and change maker for a vendor comprising:
   a credit register movable away from a zero credit position in response to deposit of money in the vendor for registering the amount deposited and resettable to said zero position, said credit register being movable to an exact price position corresponding to the price of an item to be vended and beyond said exact price position to any one of a number of change positions calling for issue of different amounts in change,
   means controlled by said credit register for controlling the vendor to permit a vend on movement of the credit register to or beyond said exact price position,
   means operable in response to a vend for resetting the credit register to its zero position,
   means for issuing coin in change in different amounts,
   means controlled by said credit register and operable in response to a vend of an item selling at said price for initiating operation of said coin issuing means to issue coin in change in accordance with the amount of change called for by the credit register, and
   a second credit register movable with the first credit register to a second exact price position and beyond said second exact price position to any one of a number of change positions calling for issue of different amounts in change, said means for initiating operation of said coin issuing means also being controlled by said second credit register and operable in response to a vend of an item selling at the second price for initiating operation of said coin issuing means to issue coin in change in accordance with the amount of change called for by the second credit register.

3. A control and change maker as set forth in claim 2 having means for escrowing deposited coins, means responsive to a vend for releasing coins from escrow for delivery to a money box, and coin return means operable to release coins from escrow for return to the depositor prior to a vend.

4. A control and change maker for a vendor comprising:
   a credit register movable away from a zero credit position in response to deposit of money in the vendor for registering the amount deposited and resettable to said zero position, said credit register being movable to an exact price position corresponding to the price of an item to be vended and beyond said exact price position to any one of a number of change positions calling for issue of different amounts in change,
   means controlled by said credit register for controlling the vendor to permit a vend on movement of the credit register to or beyond said exact price position,
   means for issuing coin in change in different amounts,
   control means for said coin issuing means movable away from a retracted position to any one of a number of change positions for determining the amount of change to be issued by the coin issuing means,
   means operable in response to movement of said credit register to any one of its change positions for presetting said control means for subsequent movement to its corresponding change position,
   means operable in response to a vend for effecting movement of said control means to its pre-set change position and effecting operation of said coin issuing means and for resetting said credit register to its zero position, and
   means for resetting said control means in its retracted position.

5. A control and change maker as set forth in claim 4 wherein said coin issuing means comprises a first holder for coins of a first denomination, a first ejector for ejecting coins from the first holder, a second holder for coins of a second and higher denomination, a second ejector for ejecting coins from the second holder, said control means being operable to control the number of operations of said ejectors.

6. A control and change maker as set forth in claim 5 wherein the credit register is responsive at least to nickels, dimes and quarters, and the first holder is for nickels and the second holder is for dimes.

7. A control and change maker as set forth in claim 5 having means for sensing depletion of the supply of coins in the second holder and means responsive thereto for effecting operation of said first ejector only to issue all change required in coins from the first holder on depletion of the supply of coins in the second holder.

8. A control and change maker as set forth in claim 7 wherein the credit register is responsive at least to nickels, dimes and quarters, the first holder being for nickels and the second holder being for dimes, and having means for sensing depletion of dimes in the second holder and means responsive thereto for effecting operation of said first ejector only to issue all change required in nickels from the first holder on depletion of the supply of dimes in the second holder.

9. A control and change maker as set forth in claim 5 having means for delivering to the first holder coins of the first denomination deposited in the vendor subsequent to actuation of the credit register thereby.

10. A control and change maker as set forth in claim 9 wherein the credit register is responsive at least to nickels, dimes and quarters, and the first holder is for nickels and the second holder is for dimes, and having means for delivering to the first holder nickels deposited in the vendor subsequent to actuation of the credit register thereby.

11. A control and change maker as set forth in claim 9 having an upper escrow for escrowing at least one coin of the first denomination prior to delivery to the first holder, a lower escrow for other coins, means responsive to a vend for releasing coin from the upper escrow for delivery to the first holder and releasing coin from the lower escrow for delivery to a money box, and coin return means operable to release coin from both the upper escrow and the lower escrow for return to the depositor prior to a vend.

12. A control and change maker as set forth in claim 5 wherein the credit register is responsive at least to nickels, dimes and quarters, and the first holder is for nickels and the second holder is for dimes, and having means for delivering to the first holder nickels deposited in the vendor subsequent to actuation of the credit register thereby, an upper escrow for escrowing at least one nickel prior to delivery to the first holder, a lower escrow for other coins, means responsive to a vend for releasing nickels from the upper escrow for delivery to the nickel holder and releasing coin from the lower escrow for delivery to a money box, and coin return means operable to release all coins from escrow for return to the depositor prior to a vend.

13. A control and change maker as set forth in claim 12 wherein the credit register is also responsive to half dollars, and having means for escrowing half dollars on edge separately from other coins.

14. A control and change maker for a vendor comprising:
- a first and a second credit register conjointly movable away from a zero credit position in response to deposit of money in the vendor for registering the amount deposited and resettable to said zero position, the first credit register being movable to a first exact price position and beyond said first exact price position to any one of a number of change positions calling for issue of different amounts in change, and the second credit register being movable to a second exact price position and beyond said second exact price position to any one of a number of change positions calling for issue of different amounts in change,
- means controlled by said credit registers for controlling the vendor to permit a vend of product selling at the first price on movement of the first credit register to or beyond said first exact price position and to permit a vend of a product selling at the second price on movement of the second credit register to or beyond said second exact price position,
- means for issuing coin in change in different amounts, control means for said coin issuing means movable away from a retracted position to any one of a number of change positions for determining the amount of change to be issued by the coin issuing means,
- means operable in response to movement of the first credit register or the second credit register to any change position thereof for pre-setting said control means for subsequent movement to its corresponding change position,
- means operable in response to a vend of a product selling at the first price for effecting movement of said control means to its pre-set change position as determined by the first credit register and operable in response to a vend of a product selling at the second price for effecting movement of said control means to its pre-set change position as determined by the second credit register, and effecting operation of said coin issuing means and for resetting said credit registers to zero position, and
- means for resetting said control means in its retracted position.

15. A control and change maker as set forth in claim 14 wherein said coin issuing means comprises a first holder for coins of a first denomination, a first ejector for ejecting coins from the first holder, a second holder for coins of a second and higher denomination, a second ejector for ejecting coins from the second holder, said control means being operable to control the number of operations of said ejectors.

16. A control and change maker as set forth in claim 15 wherein the credit registers are responsive at least to nickels, dimes and quarters, and the first holder is for nickels and the second holder is for dimes.

17. A control and change maker as set forth in claim 15 having means for sensing depletion of the supply of coins in the second holder and means responsive thereto for effecting operation of said first ejector only to issue all change required in coins from the first holder on depletion of the supply of coins in the second holder.

18. A control and change maker as set forth in claim 17 wherein the credit registers are responsive at least to nickels, dimes and quarters, the first holder being for nickels and the second holder being for dimes, and having means for sensing depletion of dimes in the second holder and means responsive thereto for effecting operation of said first ejector only to issue all change required in nickels from the first holder on depletion of the supply of dimes in the second holder.

19. A control and change maker as set forth in claim 15 having means for delivering to the first holder coins of the first denomination deposited in the vendor subsequent to actuation of the credit registers thereby.

20. A control and change maker as set forth in claim 19 wherein the credit registers are responsive at least to nickels, dimes and quarters, and the first holder is for nickels and the second holder is for dimes, and having means for delivering to the first holder nickels deposited in the vendor subsequent to actuation of the credit registers thereby.

21. A control and change maker as set forth in claim 19 having an upper escrow for escrowing at least one coin of the first denomination prior to delivery to the first holder, a lower escrow for other coins, means responsive to a vend for releasing coin from the upper escrow for delivery to the first holder and releasing coin from the lower escrow for delivery to a money box, and coin return means operable to release coin from both the upper escrow and the lower escrow for return to the depositor prior to a vend.

22. A control and change maker as set forth in claim 15 wherein the credit register is responsive at least to nickels, dimes and quarters, and the first holder is for nickels and the second holder is for dimes, and having means for delivering to the first holder nickels deposited in the vendor subsequent to actuation of the credit register thereby, an upper escrow for escrowing at least one nickel prior to delivery to the first holder, a lower escrow for other coins, means responsive to a vend for releasing nickels from the upper escrow for delivery to the nickel holder and releasing coin from the lower escrow for delivery to a money box, and coin return means operable to release all coins from escrow for return to the depositor prior to a vend.

23. A control and change maker as set forth in claim 22 wherein the credit registers are also responsive to half dollars, and having means for escrowing half dollars on edge separately from other coins.

24. A control and change maker for a vendor comprising:
- a credit register for registering the amount deposited in the vendor,
- means controlled by the credit register for controlling the vendor to permit a vend on registration of an amount corresponding to the exact price of a product to be vended or an amount over said exact price calling for issue of change,
- means for issuing coin in change comprising a first holder for coins of a first denomination, a first ejector for ejecting coins from the first holder, a second holder for coins of a second and higher denomination, a second ejector for ejecting coins from the second holder,
- means for sensing depletion of the supply of coins in the second holder, and
- means for controlling said coin issuing means to eject coins from both holders until the supply of coins in the second holder is depleted and then responsive to said sensing means for controlling said coin issuing means to eject all coins required for change from the first holder.

25. A control and change maker as set forth in claim 24 wherein the credit register is responsive at least to nickels, dimes and quarters deposited in the vendor, and the first holder is for nickels, and the second holder is for dimes.

26. In a control and change maker for a vendor,
a first ejector movable through a stroke for ejecting a coin of a unit value from a supply,
a second ejector movable through a stroke for ejecting a coin of a second denomination having twice said unit value from a supply,
means for actuating the ejectors, and
means controlling the ejector actuating means for actuating the first ejector through a stroke in response to demand for an amount in change equal to said unit value, and for actuating the second ejector through a stroke in response to demand for an amount in change equal to twice said unit value, and for actuating both ejectors through a stroke in response to demand for an amount in change equal to three times said unit value, and for actuating both ejectors through a stroke and then actuating the first ejector through a second stroke in response to demand for an amount in change equal to four times said unit value.

27. In a control and change maker as set forth in claim 26, means operable in response to depletion of the supply of coins of said second denomination for deactivating the second ejector and actuating the first ejector through two successive strokes in response to demand for an amount in change equal to twice said unit value, through three successive strokes in response to demand for an amount in change equal to three times said unit value, and through four successive strokes in response to demand for an amount in change equal to four times said unit value.

28. In a control and change maker for vendor,
an ejector movable through a stroke for ejecting a nickel from a supply of nickels,
an ejector movable through a stroke for ejecting a dime from a supply of dimes,
means for actuating the ejectors,
control means for the ejectors movable away from a retracted position to a 5¢, a 10¢, a 15¢ and a 20¢ change position, and
means responsive to movement of said control means to its 5¢ change position for actuating the nickel ejector through a stroke to eject a nickel, and responsive to movement of said control means to its 10¢ change position for actuating the dime ejector through a stroke to eject a dime, and responsive to movement of said control means to its 15¢ change position for actuating each of the nickel and dime ejectors through a stroke for ejecting a nickel and a dime, and responsive to movement of said control means to its 20¢ change position for actuating each of the nickel and dime ejectors through a first stroke for ejecting a nickel and a dime and for actuating the nickel ejector through a second stroke for ejecting a second nickel.

29. In a control and change maker for a vendor as set forth in claim 28, means operable by said ejector actuating means for resetting the control means in its retracted position.

30. In a control and change maker for a vendor as set forth in claim 28, said means for actuating the ejectors comprising a driver operable through a stroke, means for coupling the driver to the nickel ejector, and means for coupling the driver to the dime ejector, said means responsive to movement of said control means being operable on movement of said control means to its 5¢ change position to actuate the nickel ejector coupling means, and operable on movement of said control means to its 10¢ change position to actuate the dime ejector coupling means, and operable on movement of said control means to its 15¢ change position to actuate each of the nickel and dime ejector coupling means, and operable on movement of said control means to its 20¢ change position to actuate each of the nickel and dime ejector coupling means on a first stroke of the driver and the nickel ejector coupling means only on a second stroke of the driver.

31. In a control and change maker for a vendor as set forth in claim 28, means operable in response to depletion of the supply of dimes for deactivating the dime ejector and actuating the nickel ejector through two successive strokes in response to movement of the control means to its 10¢ change position to eject two nickels, through three successive strokes in response to movement of the control means to its 15¢ change position to eject three nickels, and through four successive strokes in response to movement of the control means to its 20¢ change position to eject four nickels.

32. A control and change maker for a vendor comprising:
a credit disk having a notch means for rotating the disk away from a zero credit position in response to deposit of money in the vendor for registering the amount deposited, said disk being rotatable to an exact price position coresponding to the price of an item to be vended and beyond said exact price position to any one of a number of change positions calling for issue of different amounts in change,
a pivoted arm having a follower engageable with the disk, said follower being adapted to enter the notch on rotation of the disk to the exact price position for movement of the arm to an exact price position and being movable on rotation of the disk beyond the exact price position to any one of its change positions for movement of the arm to a corresponding change position,
means controlled by the arm for controlling the vendor to permit a vend on movement of the arm to its exact price position,
coin issuing means, and
means controlled by the arm on movement to any change position for effecting operation of the coin issuing means to issue the corresponding amount in change.

33. A control and change maker for a vendor as set forth in claim 32 having
a second credit disk rotatable with the first credit disk and also having a notch, said second credit disk being rotatable away from the zero credit position in response to deposit of money in the vendor for registering the amount deposited, said second credit disk being rotatable to a second exact price position corresponding to the price of an item to be vended and beyond said second exact price position to any one of a number of change positions calling for issue of different amounts in change,
a second pivoted arm having a follower engageable with the second disk, said follower being adapted to enter the notch in said second rotation of the second disk to said second exact price position for movement of said second arm to an exact price position and being movable on rotation of the latter beyond said second exact price position to any one of its change positions for movement of said second arm to a corresponding change position,
means controlled by said second arm for controlling the vendor to permit a vend on movement of said second arm to its exact price position, and
means controlled by said second arm on movement to any change position for effecting operation of the coin issuing means to issue the corresponding amount in change.

34. A control and change maker as set forth in claim 33 wherein said disks are relatively rotatably adjustable for establishing different first and second prices.

35. A control for a vendor comprising:
a credit register for registering the amount of coin deposited in the vendor in response to deposit of nickels, dimes, quarter and half dollars, means for escrowing nickels, dimes and quarters after they have actuated the register, and means for separately escrowing a half dollar on edge after it has actuated the register.

36. A control as set forth in claim 35 wherein the means fod escrowing nickels, dimes and quarters comprises a hopper having a money box passage and a coin return passage, a gate for closing the money box passage, and a gate for closing the coin return passage, and the means for escrowing the half dollar comprises a chute on the outside of the hopper having a money box passage and a coin return passage, said chute receiving the half dollar on edge, and means extending from said gates across said chute for holding a half dollar on edge therein when said gates are closed.

References Cited

UNITED STATES PATENTS 3,004,541 10/1961 Erickson et al. _____ 194—10 X
3,367,467 2/1968 Ptacek _____ 194—10 X STANLEY H. TOLLBERG, Primary Examiner